United States Patent
Nishizaki

(10) Patent No.: US 7,286,669 B2
(45) Date of Patent: Oct. 23, 2007

(54) CIRCUITS FOR SCRAMBLING AND DESCRAMBLING PACKETS OF VARIOUS LENGTHS, AND METHODS OF DOING THE SAME

(75) Inventor: Hideki Nishizaki, Tokyo (JP)

(73) Assignee: NEC Corporation, Tokyo (JP)

( * ) Notice: Subject to any disclaimer, the term of this patent is extended or adjusted under 35 U.S.C. 154(b) by 875 days.

(21) Appl. No.: 10/147,456

(22) Filed: May 17, 2002

(65) Prior Publication Data

US 2002/0174368 A1 Nov. 21, 2002

(30) Foreign Application Priority Data

May 18, 2001 (JP) .............................. 2001-149826

(51) Int. Cl.
*H04K 1/00* (2006.01)
(52) U.S. Cl. .................................................... 380/255
(58) Field of Classification Search ................. 380/255
See application file for complete search history.

(56) References Cited

U.S. PATENT DOCUMENTS

| 5,668,810 | A | * | 9/1997 | Cannella, Jr. | ............... | 370/392 |
| 5,991,308 | A | * | 11/1999 | Fuhrmann et al. | ..... | 370/395.53 |
| 6,092,130 | A | * | 7/2000 | Horiike | ........................ | 710/69 |
| 6,618,395 | B1 | * | 9/2003 | Kimmitt | ..................... | 370/473 |
| 6,804,257 | B1 | * | 10/2004 | Benayoun et al. | .......... | 370/471 |
| 6,934,249 | B1 | * | 8/2005 | Bertin et al. | ................. | 370/218 |
| 2002/0138850 | A1 | * | 9/2002 | Basil et al. | .................. | 725/117 |

FOREIGN PATENT DOCUMENTS

| JP | 9-321750 | 12/1997 |
| JP | 10-241288 | 9/1998 |
| JP | 11-331803 | 11/1999 |
| JP | 2000-295202 | 10/2000 |
| JP | 2000-332745 | 11/2000 |
| JP | 2002-290440 | * 10/2002 |

* cited by examiner

*Primary Examiner*—Kambiz Zand
*Assistant Examiner*—Aubrey H Wyszynski
(74) *Attorney, Agent, or Firm*—McGinn IP Law Group, PLLC

(57) ABSTRACT

A circuit for descrambling a packet transmitted from and received in a communication device, includes (a) a plurality of descramblers each receiving words obtained by developing the packet in parallel and descrambling data in the words to be descrambled, each of the descramblers being associated with a combination of addresses of the data in the words, (b) a padding number detector which counts a padding number of a final word among the words, based on data indicative of a packet length, which data is included in the packet, and (c) a data selector which selects one of outputs transmitted from the descramblers in association with the combination, to thereby receive data obtained by descrambling the words, from the thus selected descrambler. A circuit for scrambling a packet includes similar components.

22 Claims, 20 Drawing Sheets

■ : CORE HEADER ( 1Byte )
   ( CORE HEADER IS NOT TO BE DESCRAMBLED )

▨ : DATA TO BE DESCRAMBLED ( 1Byte )

▨ : PADDING ( 1Byte )
   ( PADDING IS NOT TO BE DESCRAMBLED )

☐ : EMPTY ( 1Byte )

FIG.8

| LOWERMOST 3bits IN PLI | NO. OF PADDING BYTES | NO. OF BYTES TO BE DESCRAMBLED / SCRAMBLED |
|---|---|---|
| 0 0 0 | 1 0 0 | 4 Byte |
| 0 0 1 | 0 1 1 | 3 Byte |
| 0 1 0 | 0 1 0 | 2 Byte |
| 0 1 1 | 0 0 1 | 1 Byte |
| 1 0 0 | 0 0 0 | 8 Byte |
| 1 0 1 | 1 1 1 | 7 Byte |
| 1 1 0 | 1 1 0 | 6 Byte |
| 1 1 1 | 1 0 1 | 5 Byte |

■ : CORE HEADER ( 1Byte )
   ( CORE HEADER IS NOT TO BE SCRAMBLED )

▨ : DATA TO BE SCRAMBLED ( 1Byte )

▩ : PADDING ( 1Byte )
   ( PADDING IS NOT TO BE SCRAMBLED )

☐ : EMPTY ( 1Byte )

■ : CORE HEADER ( 1Byte )
   ( CORE HEADER IS NOT DESCRAMBLED )

▦ : DATA DESCRAMBLED ( 1Byte )

▨ : PADDING ( 1Byte )
   ( PADDING IS NOT DESCRAMBLED )

□ : EMPTY ( 1Byte )

- ■ : CORE HEADER ( 1Byte )
  ( CORE HEADER IS NOT TO BE SCRAMBLED )
- ▦ : DATA TO BE SCRAMBLED ( 1Byte )
- ▨ : PADDING ( 1Byte )
  ( PADDING IS NOT TO BE SCRAMBLED )
- □ : EMPTY ( 1Byte )

■ : CORE HEADER ( 1Byte )
   ( CORE HEADER IS NOT SCRAMBLED )

▨ : DATA SCRAMBLED ( 1Byte )

▩ : PADDING ( 1Byte )
   ( PADDING IS NOT SCRAMBLED )

☐ : EMPTY ( 1Byte )

CIRCUITS FOR SCRAMBLING AND DESCRAMBLING PACKETS OF VARIOUS LENGTHS, AND METHODS OF DOING THE SAME

BACKGROUND OF THE INVENTION

1. Field of the Invention

The invention relates to scrambling and descrambling in communication, and more particularly to a circuit for scrambling a communication packet, a circuit for descrambling a communication packet, a method of scrambling a communication packet, a method of descrambling a communication packet, and a communication device which scrambles and descrambles a communication packet.

2. Description of the Related Art

In a conventional method or apparatus for scrambling and descrambling a communication packet, a cell or frame having a fixed length, such as an asynchronous transfer mode (ATM) cell, is scrambled and descrambled.

The conventional method or apparatus can scramble and descramble only a cell or frame having a fixed length. Specifically, the conventional method or apparatus can scramble and descramble only an area having a fixed length, such as a payload area, in a cell or frame having a fixed length.

Accordingly, the conventional method or apparatus cannot scramble and descramble a cell having a variable length.

Japanese Unexamined Patent Publication No. 11-331803 has suggested a method of ciphering data included in a variable packet. In the suggested method, transport stream packets are grouped into first packets to be ciphered and second packets not to be ciphered. The transport stream packets to be ciphered, that is, the first packets are packets including a head of Packet Elementary Stream (PES) packets arranged in each of payloads of a plurality of transport stream packets. Only data except a header in PES packets included in the payloads of the transport stream packets is ciphered. By ciphering only data included in PES packets at their heads without ciphering the transport stream packets in its entirety, a computer can take PES packets out of the transport stream packets without necessity of deciphering PES packets.

Japanese Unexamined Patent Publication No. 2000-332745 has suggested a transmitter including first means for encoding various contents, second means for storing encoded bit series transmitted from the first means, into a packet, and keeping a part of the packet into secret for producing a packet series, third means for multiplexing a plurality of encoded bit series into a multiplexed bit series in each of packets, based on priority defined in accordance with multiplex delay assigned to each of the encoded bit series, and fourth means for controlling the second and third means. The fourth means updates a scramble key at an interval longer than a maximum multiplex delay time in the multiplexed bit series.

Japanese Unexamined Patent Publication No. 2000-295202 has ebb suggested a receiver system including a transmitter and a receiver. The transmitter includes first means for producing key data used for scrambling a plurality of channel data, and second means for scrambling channel data by virtue of the key data, and the receiver includes third means for descrambling a channel selected among the plurality of channels by virtue of the key data. The transmitter scrambles a plurality of channels by virtue of common key data, and the receiver includes fourth means for storing the common key data. Even if any channel is selected, the selected channel is descrambled by virtue of the common key data stored in the fourth means.

Japanese Unexamined Patent Publication No. 9-321750 has suggested a method of making scrambling communication between a transmitter and a receiver through a network, including the steps of dividing original data into a plurality of packet-sized data, storing the packet-sized data into a packet, assigning a false packet identifier indicative of an order of scrambled packets, to the packet, and transmitting the packet into a network in an order in which packets are scrambled in accordance with the false packet identifier. These steps are carried out at the side of the transmitter. The method further includes the steps of reproducing data indicative of a true data order, based on the false packet identifier, and reconstructing the original data, based on the true data order. These steps are carried out at the side of the receiver.

Japanese Unexamined Patent Publication No. 10-241288 has suggested an apparatus for receiving and reproducing multiplexed data. Multiplexed data has a packet structure having an inherent and fixed length, ID data for defining the packet structure, and an inherent data rate. The suggested apparatus includes first means for receiving the multiplexed data, second means for extracting desired service data, based on the ID data included in the received multiplexed data, third means for storing the extracted service data in either the apparatus or a first data-reproducer, fourth means for adding a first dummy packet having a particular ID for identifying a packet, to the extracted service data, ill accordance with both the inherent data rate of the extracted service data and a data-recording rate of the first data-reproducer, when the extracted service data is stored into the first data-reproducer, fifth means for reading the extracted service data out of the first data-reproducer, sixth means for deleting the first dummy packet from the extracted service data read out of the first data-reproducer, and seventh means for reproducing the service data from which the first dummy packet was deleted.

SUMMARY OF THE INVENTION

Hence, it is an object of the present invention to provide a circuit for scrambling a communication packet having a variable length, a circuit for descrambling a communication packet having a variable length, a method of scrambling a communication packet having a variable length, a method of descrambling a communication packet having a variable length, and a communication device which is capable of scrambling and descrambling a communication packet having a variable length.

In one aspect of the present invention, there is provided a circuit for descrambling a packet transmitted from and received in a communication device, including (a) a plurality of descramblers each receiving words obtained by developing the packet in parallel and descrambling data in the words to be descrambled, each of the descramblers being associated with a combination of addresses of the data in the words, (b) a padding number detector which counts a padding number of a final word among the words, based on data indicative of a packet length which data is included in the packet, and (c) a data selector which selects one of outputs transmitted from the descramblers in association with the combination to thereby receive data obtained by descrambling the words, from the thus selected descrambler.

It is preferable that received data is developed in parallel in 8 bytes.

The plurality of descramblers may be comprised of first to ninth descramblers where the first to eighth descramblers descramble data occupying first to N-th bytes among 8 bytes, respectively, wherein N is an integer of 1 to 8, and the ninth descrambler descrambles data occupying lower 4 bytes among 8 bytes, in which case, it is preferable that the data selector selects (a) an output transmitted from the ninth descrambler, for a top word, (b) an output transmitted from one of the first to eighth descramblers which descrambles all of 8-byte parallel data, for a word in the range of a top word to a final word, or (c) an output transmitted from one of the first to eighth descramblers, for a final word, in association with a number of bytes to be descrambled in the final word, based on a padding number of the final word detected by the padding number detector.

The circuit may further include a register which administrates a number of padding bytes for each of channels.

In another aspect of the present invention, there is provided a circuit for scrambling a packet transmitted from and received in a communication device, including (a) a plurality of scramblers each receiving words obtained by developing the packet in parallel and scrambling data in the words to be scrambled, each of the scramblers being associated with a combination of addresses of the data in the words, (b) a padding number detector which counts a padding number of a final word among the words, based on data indicative of a packet length which data is included in the packet, and (c) a data selector which selects one of outputs transmitted from the scramblers in association with the combination to thereby receive data obtained by descrambling the words, from the thus selected scrambler.

It is preferable that received data is developed in parallel in 8 bytes.

The plurality of scramblers may be comprised of first to ninth scramblers where the first to eighth scramblers descramble data occupying first to N-th bytes among 8 bytes, respectively, wherein N is an integer of 1 to 8, and the ninth scrambler descrambles data occupying lower 4 bytes among 8 bytes, in which case, it is preferable that the data selector selects (a) an output transmitted from the ninth scrambler, for a top word, (b) an output transmitted from one of the first to eighth scramblers which scrambles all of 8-byte parallel data, for a word in the range of a top word to a final word, or (c) an output transmitted from one of the first to eighth scramblers, for a final word, in association with a number of bytes to be scrambled in the final word, based on a padding number of the final word detected by the padding number detector.

The circuit may further include a register which administrates a number of padding bytes for each of channels.

In still another aspect of the present invention, there is provided a method of descrambling a packet transmitted from and received in a communication device, including the steps of (a) developing the packet in parallel into words, (b) descrambling data in the words to be descrambled, the step (b) being to be carried out a plurality of times in association with a combination of addresses of the data in the words, (c) counting a padding number of a final word among the words, based on data indicative of a packet length which data is included in the packet, and (d) selecting one of results resulted from the step (b) in association with the combination.

The method may further include the step of developing received data in parallel in 8 bytes.

The step (b) may include the steps of (b1) descrambling data occupying first to N-th bytes among 8 bytes, respectively, wherein N is an integer of 1 to 8, and (b2) descrambling data occupying lower 4 bytes among 8 bytes, and the step (d) may include the step of selecting (d1) a result of the step (b2), for a top word, (d2) a result of the step (b0) for a word in the range of a top word to a final word, or (d3) a result of the step (b0) for a final word, in association with a number of bytes to be descrambled in the final word, based on a padding number of the final word detected in the step (c).

The method may further include the step of administrating a number of padding bytes for each of channels.

There is yet another aspect of the present invention, there is provided a method of scrambling a packet transmitted from and received in a communication device, including the steps of (a) developing the packet in parallel into words, (b) scrambling data in the words to be scrambled, the step (b) being to be carried out a plurality of times in association with a combination of addresses of the data in the words, (c) counting a padding number of a final word among the words, based on data indicative of a packet length which data is included in the packet, and (d) selecting one of results resulted from the step (b) in association with the combination.

The method may further include the step of developing received data in parallel in 8 bytes.

The step (b) may include the steps of (b1) scrambling data occupying first to N-th bytes among 8 bytes, respectively, wherein N is an integer of 1 to 8, and (b2) scrambling data occupying lower 4 bytes among 8 bytes, and the step (d) may include the step of selecting (d1) a result of the step (b2), for a top word, (d2) a result of the step (b1) for a word in the range of a top word to a final word, or (d3) a result of the step (b1) for a final word, in association with a number of bytes to be scrambled in the final word, based on a padding number of the final word detected in the step (c).

The method may further include the step of administrating a number of padding bytes for each of channels.

In still yet another aspect of the present invention, there is provided a communication device receiving a packet therein and transmitting a packet therefrom, including (a) a first circuit for descrambling the packet, the first circuit including a plurality of descramblers each receiving words obtained by developing the packet in parallel and descrambling data in the words to be descrambled, each of the descramblers being associated with a combination of addresses of the data in the words, (b) a second circuit for scrambling the packet, the second circuit including a plurality of scramblers each receiving words obtained by developing the packet in parallel and scrambling data in the words to be scrambled, each of the scramblers being associated with a combination of addresses of the data in the words, (c) a padding number detector which counts a padding number of a final word among the words, based on data indicative of a packet length which data is included ill the packet, and (d) a data selector which selects one of outputs transmitted from the descramblers in association with the combination to thereby receive data obtained by descrambling the words, from the thus selected descrambler, and which further selects one of outputs transmitted from the scramblers in association with the combination to thereby receive data obtained by scrambling the words, from the thus selected scrambler.

In the communication device, received data is preferably developed in parallel in 8 bytes.

The plurality of descramblers may be comprised of first to ninth descramblers where the first to eighth descramblers descramble data occupying first to N-th bytes among 8 bytes, respectively, w herein N is an integer of 1 to 8, and the ninth descrambler descrambles data occupying lower 4 bytes among 8 bytes, in which case, the data selector selects (a) an output transmitted from the ninth descrambler, for a top word, (b) an output transmitted from one of the first to eighth descramblers which descrambles all of 8-byte parallel data, for a word in the range of a top word to a final word, or (c) an output transmitted from one of the first to eighth descramblers, for a final word, in association with a number of bytes to be descrambled in the final word, based on a padding number of the final word detected by the padding number detector.

The plurality of scramblers may be comprised of first to ninth scramblers where the first to eighth scramblers descramble data occupying first to N-th bytes among 8 bytes, respectively, wherein N is an integer of 1 to 8, and the ninth scrambler descrambles data occupying lower 4 bytes among 8 bytes, in which case, the data selector selects (a) an output transmitted from the ninth scrambler, for a top word, (b) an output transmitted from one of the first to eighth scramblers which scrambles all of 8-byte parallel data, for a word in the range of a top word to a final word, or (c) an output transmitted from one of the first to eighth scramblers, for a final word, in association with a number of bytes to be scrambled in the final word, based on a padding number of the final word detected by the padding number detector.

It is preferable that the communication device further includes a register which administrates a number of padding bytes for each of channels.

The advantages obtained by the aforementioned present invention will be described hereinbelow.

In accordance with the above-mentioned present invention, it is possible to descramble and scramble a communication packet having a variable length. Specifically, a padding number in a final word is calculated, based on data indicative of a packet length which data is added to a communication packet, and then, bytes to be descrambled or scrambled in the final word is counted. Thus, only the bytes to be descrambled or scrambled are actually descrambled or scrambled in the final word in a communication packet having been developed in parallel.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 8 shows correspondence among PLI, a number of padding bytes, and a number of bytes to be descrambled or scrambled in a final word.

DESCRIPTION OF THE PREFERRED EMBODIMENTS

Preferred embodiments in accordance with the present invention will be explained hereinbelow with reference to drawings.

First Embodiment

Figure 1:
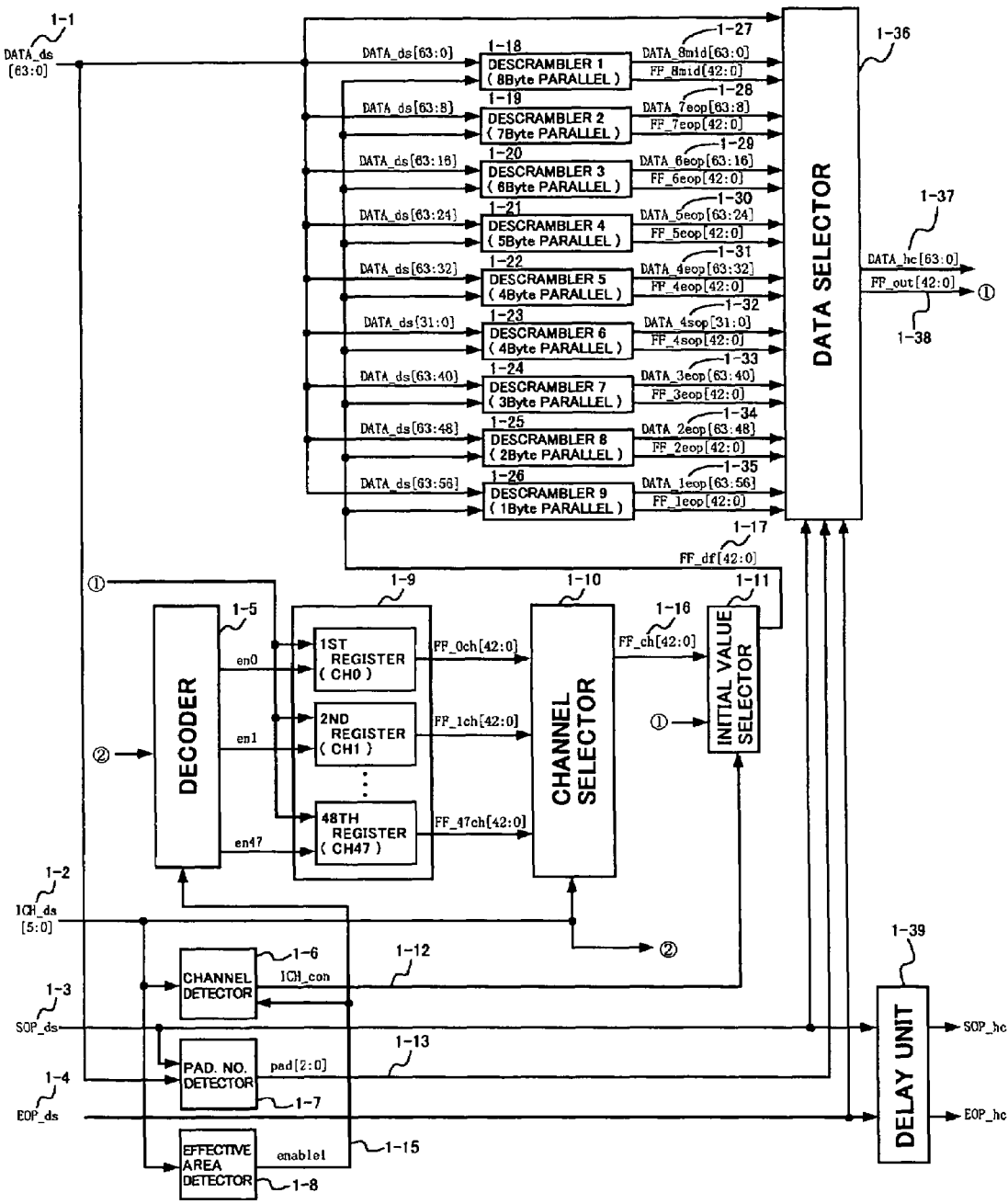
FIG. 1 is a block diagram of the circuit for descrambling a communication packet, in accordance with the first embodiment of the present invention.

FIG. 1 is a block diagram of the circuit in accordance with the first embodiment. The circuit is constructed as a circuit for descrambling a communication packet having a variable length. The circuit in accordance with the first embodiment is designed to descramble a generic framing procedure (GFP) frame as a communication packet having a variable length.

Figure 7:
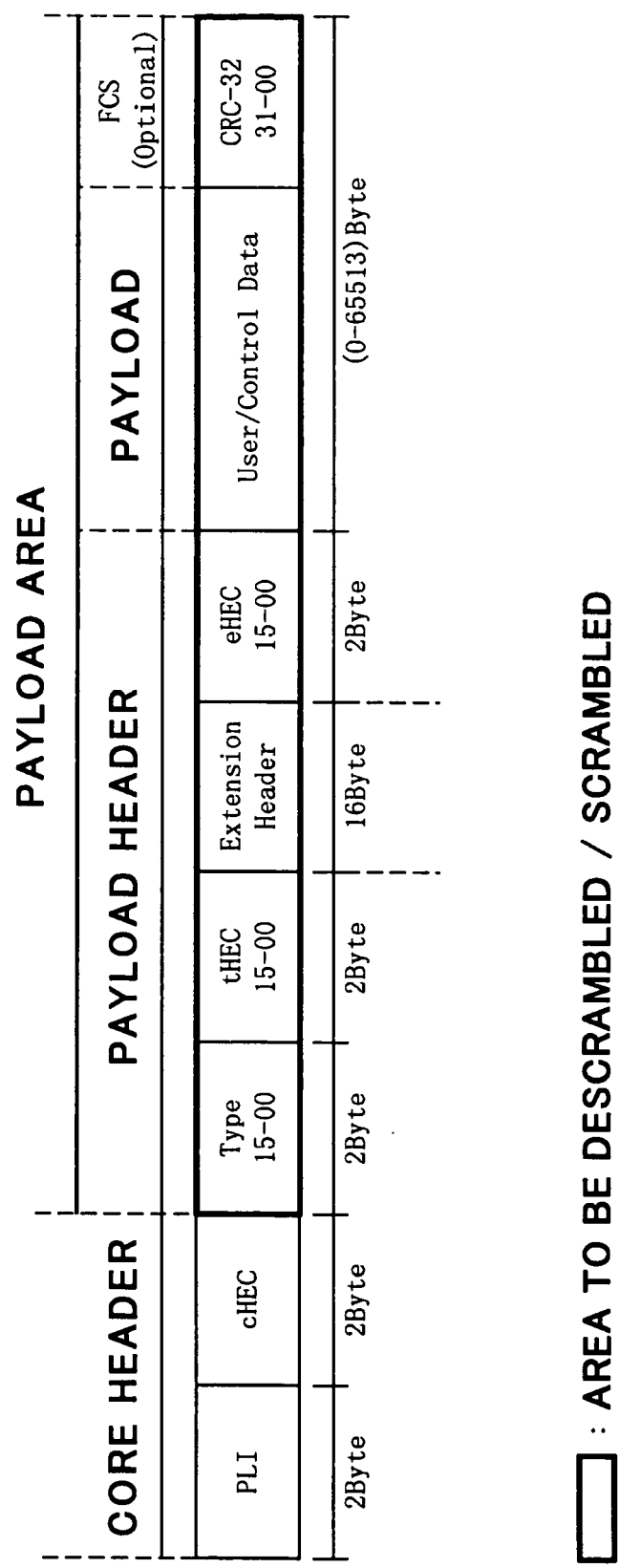
FIG. 7 illustrates a structure of GFT frame.

FIG. 7 illustrates a structure of a GFP frame. As illustrated in FIG 7, the GFP frame is comprised of a core header and a payload area. The payload area is comprised of a payload header, payload, and a frame check sequence (FCS). The payload area enclosed with a thick line is to be descrambled.

When GFP frame is developed in parallel in 8 bytes, as illustrated in later mentioned FIGS. 2 and 10, first four bytes in a first world are not descrambled. A number of bytes to be descrambled in a final word is dependent on a number of bytes of the payload area.

FIG. 8 shows correspondence among PLI, a number of padding bytes designated in an output signal transmitted from a later mentioned padding number detector 1-7, and a number of bytes to be descrambled in a final word.

Herein, PLI means data indicative of a number of bytes in the payload area illustrated in FIG. 7. In the first embodiment, since a communication packet is descrambled in parallel in 8 bytes, it is possible to count a number of padding bytes in association with lowermost three bits of PLI.

Referring back to FIG. 1, the circuit for descrambling a communication packet (hereinafter, referred to simply as "the descrambling circuit"), in accordance with the first embodiment, is designed to descramble received data in parallel in 8 bytes and accommodate 48 channels.

The descrambling circuit in accordance with the first embodiment is comprised of a decoder 1-5, a channel detector 1-6 which continuously detects channels, a padding number detector 1-7 which detects a number of padding bytes, an effective area detector 1-8 which detects an effective area, a flip-flop (FF) initial value register 1-9, a channel selector 1-10, an initial value selector 1-11, first to ninth descramblers 1-18 to 1-26, a data selector 1-36, and a delay unit 1-39.

The FF initial value register 1-9 is comprised of first to forty-eighth registers each having a FF initial value of CH0 to CH47, respectively.

The channel detector 1-6 receives an input channel signal 1-2, and transmits a channel detection signal 1-12 to the initial value selector 1-11 when the same channels are continuously detected.

The padding number detector 1-7 receives a signal 1-3 indicative of a top word in a received communication packet, calculates a number of padding bytes, based on data included in PLI area illustrated in FIG. 7 which data is indicative of a packet length at a top word in a communication packet, and transmits a signal 1-13 indicative of the calculated number of padding bytes to the data selector 1-36.

The effective area detector 1-8 receives the input channel signal 1-2 to which an input packet 1-1 belongs, judges whether a channel designated in the input channel signal 1-2 is in use or not, and transmits an enable signal 1-15 which enables the channel only when the channel is in use, to the decoder 1-5.

The decoder 1-5 receives the input channel signal 1-2 and the enable signal 1-15, decodes the input channel signal 1-2 only when the enable signal 1-15 indicates that the channels are to be enabled, and transmits a signal by which a channel output transmitted from the associated register among the first to forty-eighth registers in the FF initial value register 1-9 is enabled.

Each of the first to forty-eighth registers in the FF initial value register 1-9 is comprised of forty three flip-flops necessary for descrambling a communication packet. The first to forty-eighth registers descramble a communication packet independently of one another in channel unit. Thus, the FF initial value register 1-9 accommodates forty-eight channels.

A value stored in the flip-flops defines an FF initial value to be used when a communication packet is descrambled in each of forty-eight channels. Each initial value is updated into a FF value 1-38 transmitted from the data selector 1-36, in accordance with the enable signal 1-15 transmitted from the decoder 1-5. The initial values stored in the flip-flops for each of channels are transmitted to the channel selector 1-10. The reason for storing data in each of channels in the FF initial value register 1-9 is that it is preferable to descramble a communication packet continuously in channels without descrambling a communication packet channel by channel.

The channel selector 1-10 selects one of the initial values in each of channels, transmitted from the FF initial value register 1-9, in accordance with the input channel signal 1-2, and transmits the thus selected initial value to the initial value selector 1-11 as a FF initial value signal 1-16.

The initial value selector 1-11 receives the channel selection signal 1-12 from the channel detector 1-6. If the received channel selection signal 1-12 indicates that the same channels were continuously detected, the initial value selector 1-11 selects the FF value 1-38 transmitted from the data selector 1-36, whereas if the received channel selection signal 1-12 indicates that the same channels were not continuously detected, the initial value selector 1-11 selects the FF initial value signal 1-16 transmitted from the channel selector 1-10. The initial value selector 1-11 outputs the thus selected signal as a FF initial value signal 1-17.

The first descrambler 1-18 is a circuit for descrambling eight bytes in 8-byte parallel data, and transmits both principal signal data after descrambling data and a FF value 1-27 to be used when next data is descrambled.

The second descrambler 1-19 is a circuit for descrambling first seven bytes in 8-byte parallel data, and transmits both principal signal data after descrambling data and a FF value 1-28 to be used when next data is descrambled.

The third descrambler 1-20 is a circuit for descrambling first six bytes in 8-byte parallel data, and transmits both principal signal data after descrambling data and a FF value 1-29 to be used when next data is descrambled.

The fourth descrambler 1-21 is a circuit for descrambling first five bytes in 8-byte parallel data, and transmits both principal signal data after descrambling data and a FF value 1-30 to be used when next data is descrambled.

The fifth descrambler 1-22 is a circuit for descrambling first four bytes in 8-byte parallel data, and transmits both principal signal data after descrambling data and a FF value 1-31 to be used when next data is descrambled.

The seventh descrambler 1-24 is a circuit for descrambling first three bytes in 8-byte parallel data, and transmits both principal signal data after descrambling data and a FF value 1-33 to be used when next data is descrambled.

The eighth descrambler 1-25 is a circuit for descrambling first two bytes in 8-byte parallel data, and transmits both principal signal data after descrambling data and a FF value 1-34 to be used when next data is descrambled.

The ninth descrambler 1-26 is a circuit for descrambling only first byte in 8-byte parallel data, and transmits both principal signal data after descrambling data and a FF value 1-35 to be used when next data is descrambled.

The sixth descrambler 1-23 is a circuit for descrambling lowermost four bytes, that is, fifth to eighth bytes in 8-byte parallel data, and transmits both principal signal data after descrambling data and a FF value 1-32 to be used when next data is descrambled.

The data selector 1-36 selects data which is to be descrambled and has been actually descrambled among the principal signal data and the FF values 1-27 to 1-35 transmitted from the first to ninth descramblers 1-18 to 1-26, and outputs the thus selected data as a principal signal data 1-37 and a FF value 1-38 to be used for descrambling next data.

The data selector 1-86 selects data as follows.

The data selector 1-36 detects a timing of a top word, based on the signal 1-3 indicative of a top word in a communication packet, and further detects a timing of a final word, based on a signal indicative of a final word in a communication packet. As illustrated in FIG. 7, lowermost four bytes in 8-byte parallel data is to be descrambled for a top word. Hence, the data selector 1-36 selects an output transmitted from the sixth descrambler 1-23. All of 8-byte parallel data is to be descrambled for a word in the range of a top word to a final word. Hence, the data selector 1-36 selects an output transmitted from the first descrambler 1-18. Data to be descrambled is dependent on a number of padding bytes for a final word. Hence, the data selector 1-36 selects an output transmitted from an associated descrambler among the first to ninth descramblers 1-27 to 1-35 in accordance with the signal 1-13 indicative of a number of padding bytes, transmitted from the padding number detector 1-7.

The delay unit 1-39 receives the signal 1-3 indicative of a top word in a communication packet and a signal 1-4 indicative of a final word in a communication packet, and delays the signals 1-3 and 1-4 in accordance with a delay in the principal signal data.

Figure 2:
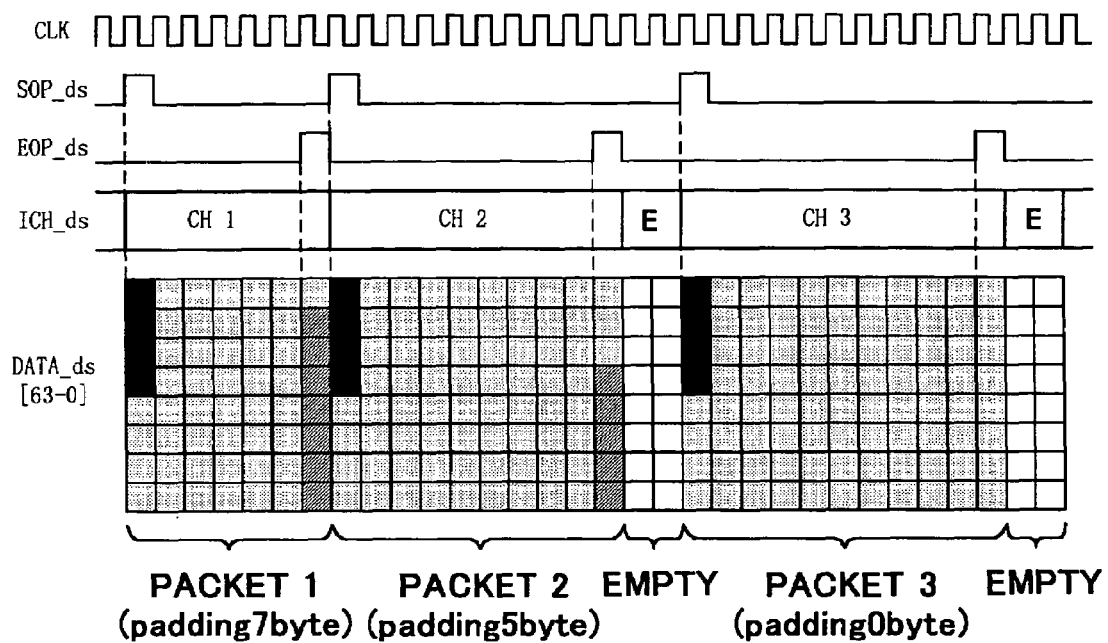
FIG. 2 illustrates an example of data structure to be input into the circuit for descrambling a communication packet, in accordance with the first embodiment.

FIG. 2 illustrates an example of data to be input into the descrambling circuit illustrated in FIG. 1.

As illustrated in FIG. 2, a principal signal data indicated as DATA_ds [63-0] is developed in parallel into 8-byte data, and then, input into the descrambling circuit. A first signal (SOP_ds) indicative of a top word in a communication packet and a second signal (EOP_ds) indicative of a final word in a communication packet simultaneously run. That is, an interval between a timing at which the first signal is at a high level (SOP_ds=1) and a timing at which the second signal is at a high level (EOP_ds=1) indicates packet data. A third signal (ICH_ds) indicative of a channel number to which an input packet belongs runs simultaneously with the first and second signals.

Hereinbelow is explained an operation of the descrambling circuit in accordance with the first embodiment. The descrambling circuit in accordance with the first embodiment descrambles a communication packet having a variable length, such as GFP frame.

A circuit for scrambling a packet scrambles payload in a transmission line such that a probability by which "0" and "1" occur in the payload is equal to ½. Scrambling a packet further presents an advantage that a probability by which packets are wrongly synchronized with each other is reduced, in which case, a primitive polynomial is defined as $X^{43}+1$.

In addition, a circuit for scrambling packets continuously scrambles a packet for each of channels to which the packet belongs. That is, scrambling a packet does not finish even if one packet is scrambled.

The descrambling circuit reproduces the scrambled payload into original data. Similarly to a circuit for scrambling a packet, the descrambling circuit continuously descrambles packets for each of channels to which the packet belongs.

When the descrambling circuit stores high-rate data such as data having a rate of 2.4 Gbps, such high-rate data may be stored in the form of low-rate data converted in parallel from the high-rate data, such as 52 Mbps×8 byte parallel. When a packet having a variable length is developed in parallel, the packet is treated as a packet having 8×N bytes (N is a positive integer) by adding a padding or empty byte or bytes thereto, in order that a top bit in the packet is arranged in MSB in parallel data, because such a packet can be readily processed.

When a packet having a variable length is developed in the above-mentioned manner, data to be descrambled in accordance with a packet length and padding bytes not to be descrambled coexist in a final word in the packet.

In the descrambling circuit in accordance with the first embodiment, the final word is descrambled by calculating a padding number ill a final word, based on data indicative of a packet length which data is included in a communication packet. Thus, it is possible to descramble a packet comprised of various byte length, and hence having a variable length.

An operation of the descrambling circuit in accordance with the first embodiment is explained in detail hereinbelow.

An input packet 1-1 is descrambled by one of the first to ninth descramblers 1-18 to 1-26, based on the FF initial value signal 1-17 which determines a descrambler for descrambling the input packet 1-1, among the first to ninth descramblers 1-18 to 1-26.

The first to ninth descramblers 1-18 to 1-26 descramble bytes different from one another with respect to their number and position. Hence, the bytes are descrambled by a descrambler designed to descramble the bytes, as follows.

Lowermost four bytes in a 8-byte parallel data is to be descrambled for a top word. Accordingly, the data selector 1-36 selects the principal signal data and the FF value 1-32 transmitted from the sixth descrambler 1-23.

All of 8-byte parallel data is to be descrambled for a word in the range of a top word to a final word. Hence, the data selector 1-36 selects the principal signal data and the FF value 1-27 transmitted from the first descrambler 1-18.

Data to be descrambled is dependent on a number of padding bytes for a final word.

If a number of padding bytes is seven wherein data to be descrambled has one byte, the data selector 1-36 selects the principal signal data and the FF value 1-35 transmitted from the ninth descrambler 1-26.

If a number of padding bytes is six wherein data to be descrambled has two bytes, the data selector 1-36 selects the principal signal data and the FF value 1-34 transmitted from the eighth descrambler 1-25.

If a number of padding bytes is five wherein data to be descrambled has three bytes, the data selector 1-36 selects the principal signal data and the FF value 1-33 transmitted from the seventh descrambler 1-24.

If a number of padding bytes is four wherein data to be descrambled has four bytes, the data selector 1-36 selects the principal signal data and the FF value 1-31 transmitted from the fifth descrambler 1-22.

If a number of padding bytes is three wherein data to be descrambled has five bytes, the data selector 1-36 selects the principal signal data and the FF value 1-30 transmitted from the fourth descrambler 1-21.

If a number of padding bytes is two wherein data to be descrambled has six bytes, the data selector 1-36 selects the principal signal data and the FF value 1-29 transmitted from the third descrambler 1-20.

If a number of padding bytes is one wherein data to be descrambled has seven bytes, the data selector 1-36 selects the principal signal data and the FF value 1-28 transmitted from the second descrambler 1-19.

If a number of padding bytes is zero wherein data to be descrambled has eight bytes, the data selector 1-36 selects the principal signal data and the FF value 1-27 transmitted from the first descrambler 1-18.

The padding number detector 1-7 detects PLI in the core header (See FIG. 7), which PLI is indicative of a number of bytes in the payload area, at a timing of a top word, and counts a number of padding bytes added to a final word in a communication packet. The padding number detector 1-7 transmits the thus counted number of padding bytes to the data selector 1-36.

Since a communication packet is processed in 8-byte parallel in the first embodiment, a number of padding bytes can be in the range of 0 to 7. Hence, if such GFP frame as illustrated in FIG. 7 is to be descrambled, it would be possible to count a number of padding bytes in lowermost three bits and bits greater than the lowermost three bits in PLI indicative of a packet length or a number of bytes in the payload area.

The FF value 1-38 selected by the data selector 1-36 is stored in a storage region of a register having an associated channel among the first to forty-eighth registers in the FF initial value register 1-9, and is used as a FF initial value when data is descrambled next in the same channel.

Only the FF value stored in a register having a channel indicated by the input channel signal 1-2 in the communication packet, among the first to forty-eighth registers in the FF initial value register 1-9 is updated to the FF value 1-38 transmitted from the data selector 1-36, if the enable signal transmitted from the decoder 1-5 is valid.

The effective area detector 1-8 receives the input channel signal 1-2, and transmits the enable signal 1-15 to the decoder 1-5. If channels indicated by the input channel signal 1-2 are judged valid by the effective area detector 1-8, the enable signal 1-5 transmitted from the effective area detector 1-8 indicates that the channels are enabled, whereas if channels indicated by the input channel signal 1-2 are judged invalid by the effective area detector 1-8, the enable signal 1-5 transmitted indicates that the channels are disenabled. For instance, if forty-eight channels (5-bit signal) in the range of zero-th to forty-seventh channels are in use, the effective area detector 1-8 judges channel numbers 48 to 63 invalid.

The channel selector 1-10 selects one of the initial value outputs transmitted from the FF initial value register 1-9 in each of channels, in accordance with the input channel signal 1-2, and transmits the thus selected output to the initial value selector 1-11 as a FF initial value signal 1-16 indicative of a FF initial value to be used for descrambling data in a target channel.

If data is to be descrambled in words continuously in the same channel, a FF initial value might not be updated in time for the step of descrambling a next word. Hence, if data is to be descrambled continuously in the same channel, the FF value 1-38 transmitted from the data selector 1-36 is selected by the initial value selector 1-11, and is used as a FF initial value when the first to ninth descramblers 1-18 to 1-26 descramble data.

The channel detector 1-6 judges whether data in the same channel continues or not by observing the input channel signal 1-2. The channel detector 1-6 transmits the judgment result to the initial value selector 1-11 as the channel detection signal 1-12.

If data to be descrambled hi the same channel does not continue, the FF initial value signal 1-16 transmitted from the channel selector 1-6 is selected by the initial value selector 1-11, and is used as a FF initial value when the first to ninth descramblers 1-18 to 1-26 descramble data.

Figure 3:
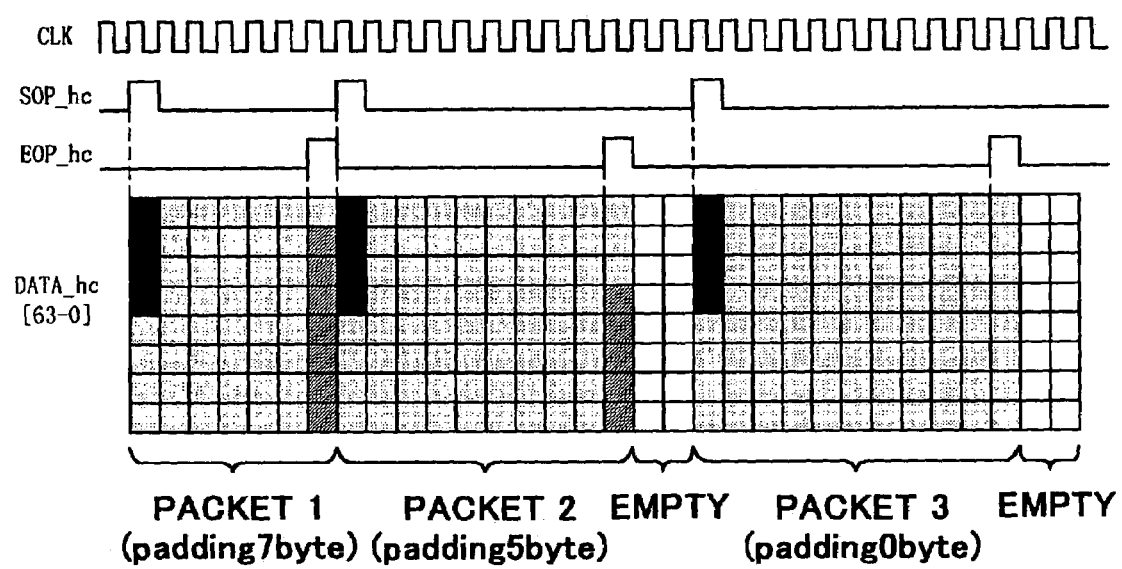
FIG. 3 illustrates an example of data structure to be output from the circuit for descrambling a communication packet, in accordance with the first embodiment.

FIG. 3 illustrates an example of data to be output from the descrambling circuit illustrated in FIG. 1.

As illustrated in FIG. 3, a principal signal data indicated as DATA_hc [63-0] is developed in parallel into 8-byte data, and then, output from the descrambling circuit. A first signal (SOP_hc) indicative of a top word in a communication packet and a second signal (EOP_hc) indicative of a final word in a communication packet simultaneously run. That is, an interval between a timing at which the first signal is at a high level (SOP_hc=1) and a timing at which the second signal is at a high level (EOP_hc=1) indicates packet data.

Hereinbelow is explained characterizing parts of the descrambling circuit in accordance with the first embodiment, in comparison with a conventional descrambling circuit.

Figure 4:
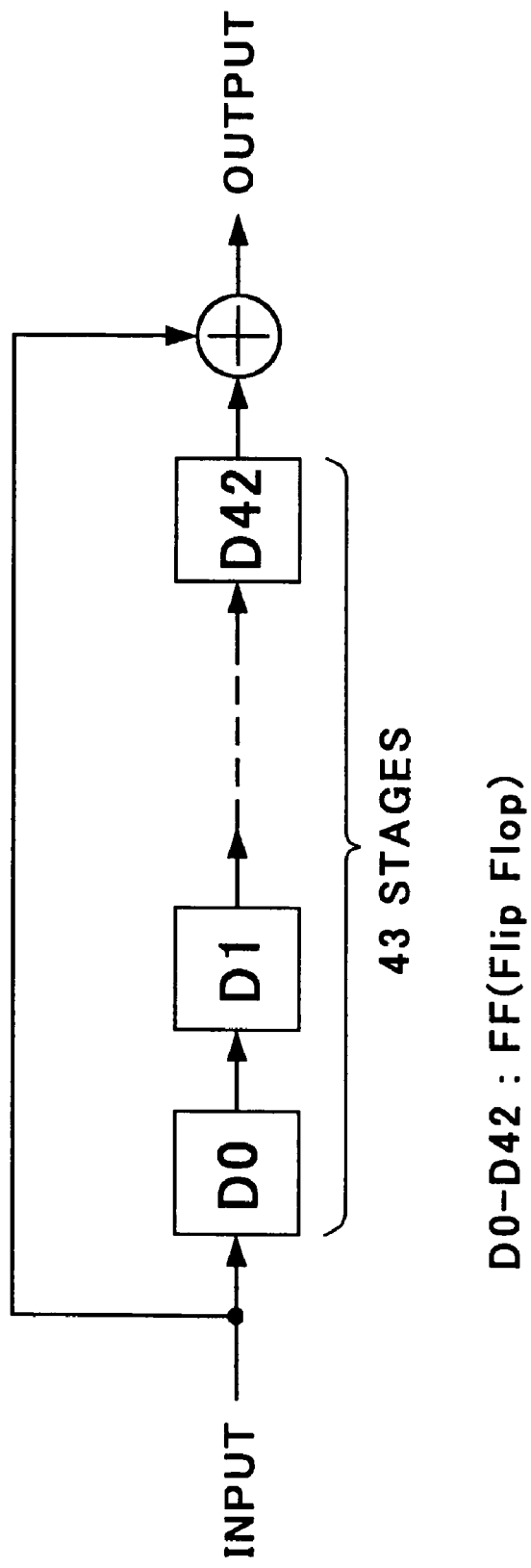
FIG. 4 is a block diagram of a conventional circuit for descrambling a communication packet.

FIG. 4 is a block diagram of a conventional circuit for descrambling a communication packet. Herein, it is assumed that the descrambling circuit illustrated in FIG. 4 descrambles a packet having a variable length, such as GFP frame illustrated in FIG. 7, in which case, a primitive polynomial is defined as $X^{43}+1$.

The illustrated conventional descrambling circuit is comprised of forty three flip-flops (FF) D0 to D42 and an exclusive-OR. The exclusive-OR receives an input signal received in the descrambling circuit, and the input signal having passed through the forty three flip-flops D0 to D42, and transmits an output signal as descrambled data.

Each of the first to forty-eighth registers in the FF initial value register 1-9 in the first embodiment is comprised of forty three flip-flops corresponding to the forty three flip-flops of the conventional descrambling circuit illustrated in FIG. 4.

Figure 5:
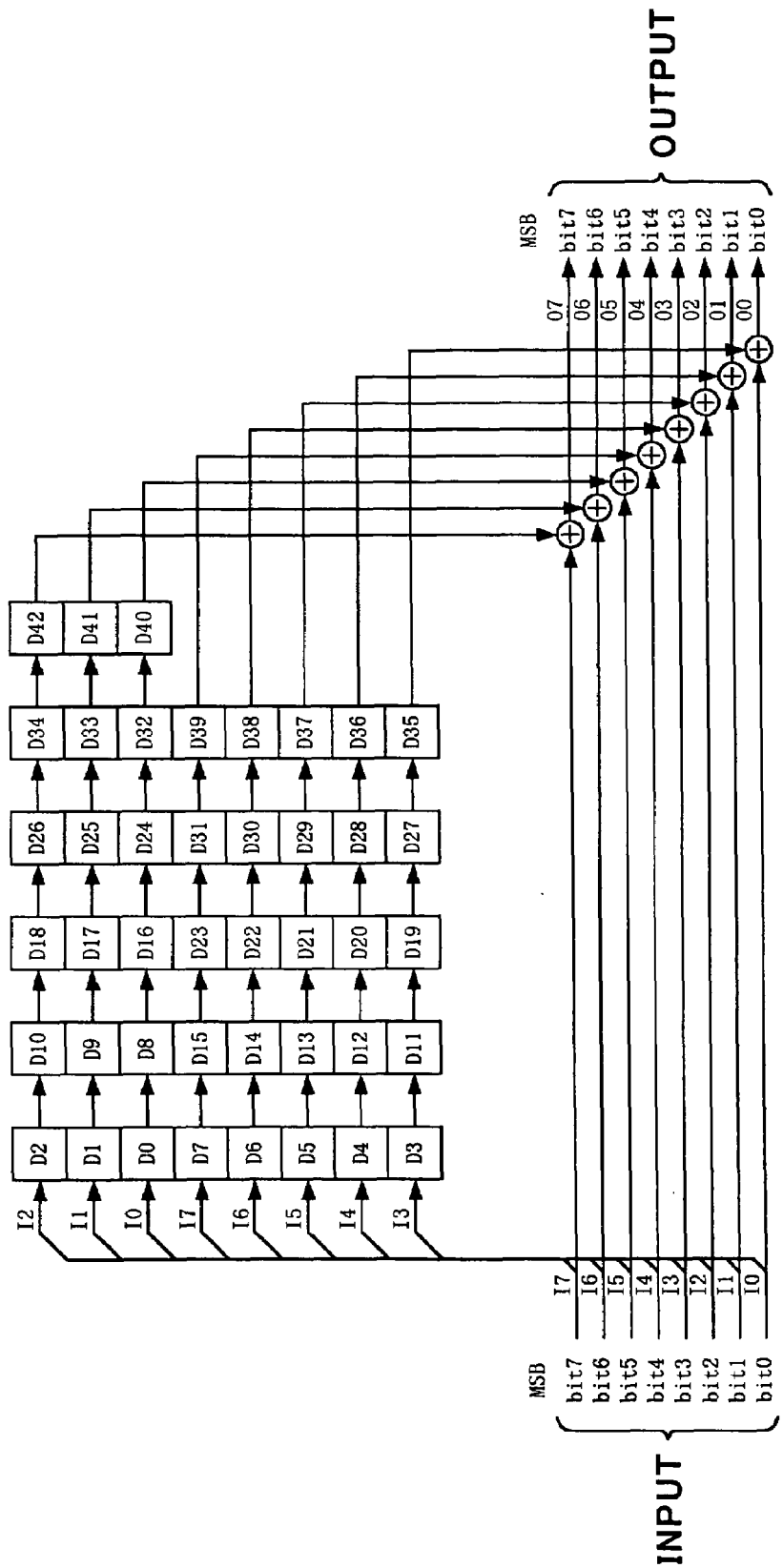
FIG. 5 illustrates how a conventional circuit for descrambling a communication packet deals with 8-bit data received in parallel.

FIG. 5 is a block diagram of a circuit for descrambling 8-bit (1-byte) data received in parallel, through the use of the conventional circuit illustrated in FIG. 4. The circuit illustrated in FIG. 5 is identical with the circuit illustrated in FIG. 4 with respect to a basic principle. The circuit is comprised of forty three flip-flops and eight exclusive-ORs.

Figure 6:
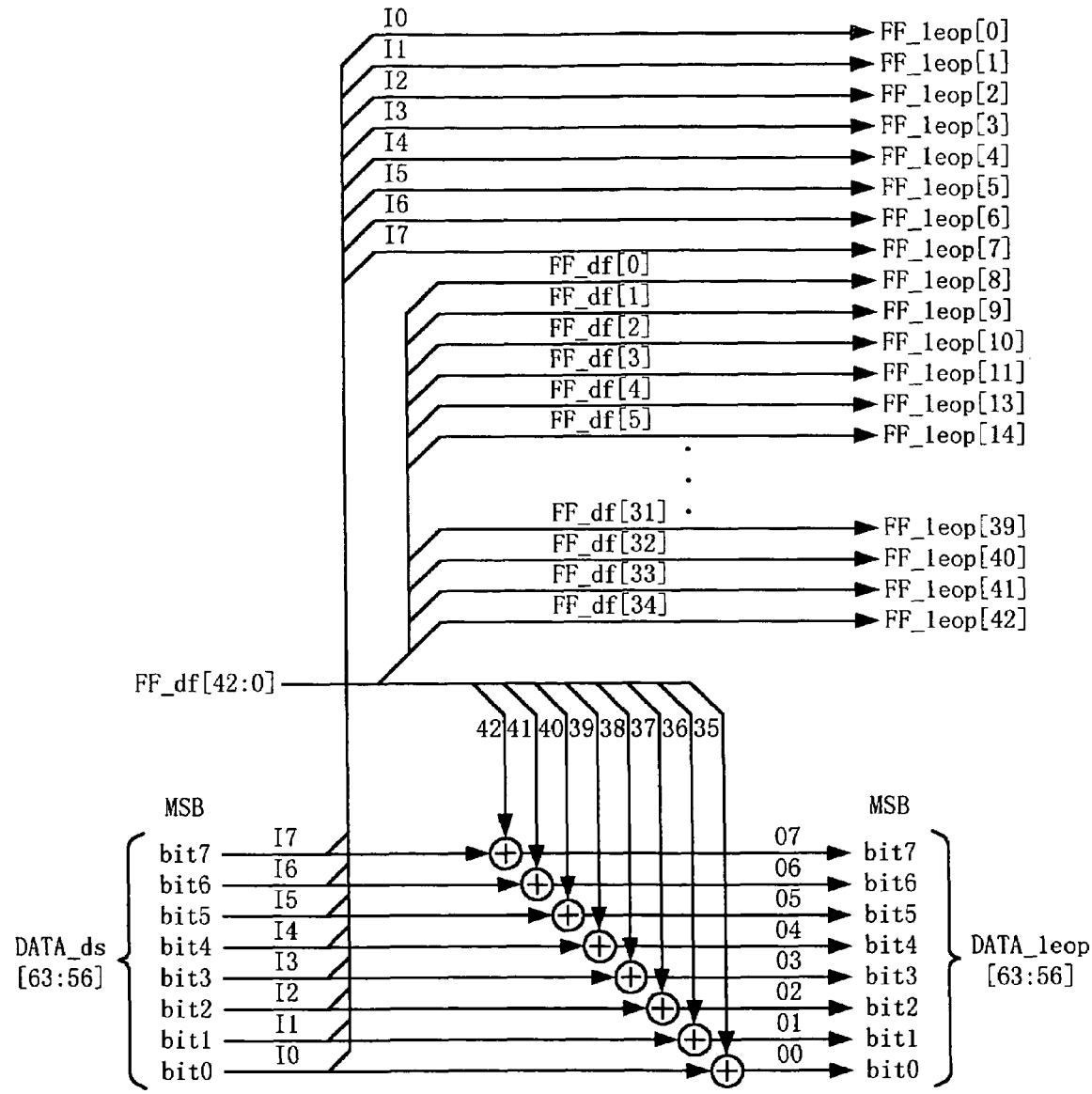
FIG. 6 is a block diagram of an internal structure of a descrambler receiving 1-byte data in parallel which descrambler partially constitutes the circuit in accordance with the first embodiment.

FIG. 6 illustrates a structure of the ninth descrambler 1-26 in the first embodiment. The ninth descrambler 1-26 is identical to the circuit illustrated in FIG. 5 with respect only to the flip-flops. A flip-flop in the 1-byte parallel descrambling circuit corresponds to a flip-flop having the associated channel in the FF initial value register 1-9.

The first to eighth descramblers 1-18 to 1-25 is identical in structure to the ninth descrambler 1-26 illustrated in FIG. 6, though a number of bytes into which data is developed in parallel is different from one another.

As having been explained above, in the descrambling circuit in accordance with the first embodiment, the padding number detector 1-7 calculates a padding number in a final word, based on data indicative of a packet length which data is added to a communication packet. Then, bytes to be scrambled in the final word is counted. Thus, only the bytes to be descrambled are actually descrambled in the final word in a communication packet having been developed in parallel. As a result, the descrambling circuit in accordance with the first embodiment makes it possible to descramble a communication packet having a variable length.

Second Embodiment

Figure 9:
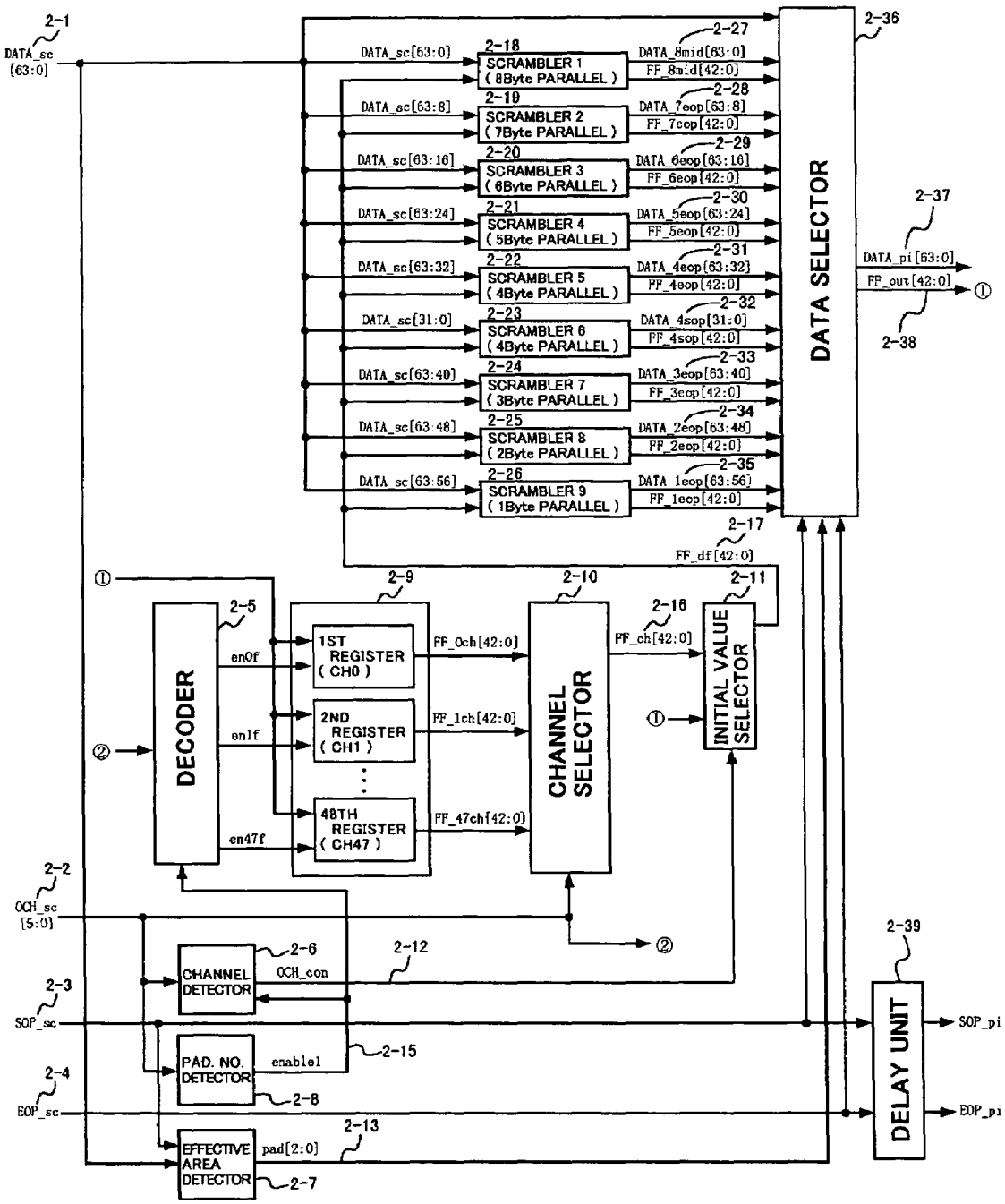
FIG. 9 is a block diagram of the circuit for scrambling a communication packet, in accordance with the second embodiment of the present invention.

FIG. 9 is a block diagram of the circuit in accordance with the second embodiment. The circuit is constructed as a circuit for scrambling a communication packet having a variable length. The circuit in accordance with the second embodiment is designed to scramble such a generic framing procedure (GFP) frame as illustrated in FIG. 7, as a communication packet having a variable length.

Referring to FIG. 9, the circuit for scrambling a communication packet (hereinafter, referred to simply as "the scrambling circuit"), in accordance with the second embodiment, is designed to scramble received data in parallel in 8 bytes and accommodate 48 channels.

The scrambling circuit in accordance with the second embodiment is comprised of a decoder 2-5, a channel detector 2-6 which continuously detects channels, a padding number detector 2-7 which detects a number of padding bytes, an effective area detector 2-8 which detects an effective area, a FF initial value register 2-9, a channel selector 2-10, an initial value selector 2-11, first to ninth scramblers 2-18 to 2-26, a data selector 2-36, and a delay unit 2-39.

The FF initial value register 2-9 is comprised of first to forty-eighth registers each having a FF initial value of CH0 to CH47, respectively.

The channel detector 2-6 receives an output channel signal 2-2, and transmits a channel detection signal 2-12 to the initial value selector 2-11 when the same channels are continuously detected.

The padding number detector 2-7 receives a signal 2-3 indicative of a top word in a received communication packet, calculates a number of padding bytes, based on data included in PLI area illustrated in FIG. 7 which data is indicative of a packet length at a top word in a communication packet, and transmits a signal 2-13 indicative of the calculated number of padding bytes to the data selector 2-36.

The effective area detector 2-8 receives the input channel signal 2-2 to which an input packet 2-1 belongs, judges whether a channel designated in the input channel signal 2-2 is in use or not, and transmits an enable signal 2-15 which enables the channel only when the channel is in use, to the decoder 2-5.

The decoder 2-5 receives the output channel signal 2-2 and the enable signal 2-15, decodes the output channel signal 2-2 only when the enable signal 2-15 indicates that the channels are to be enabled, and transmits a signal by which a channel output transmitted from the associated register among the first to forty-eighth registers in the FF initial value register 2-9 is enabled.

Each of the first to forty-eighth registers in the FF initial value register 2-9 is comprised of forty three flip-flops (FBE) necessary for scrambling a communication packet. The first to forty-eight registers scramble a communication packet independently of one another in channel unit. Thus, the FF initial value register 2-9 accommodates forty-eight channels.

A value stored in the flip-flops defines an FF initial value to be used when a communication packet is scrambled in each of forty-eight channels. Each initial value is updated into a FF value 2-38 transmitted from the data selector 2-36, in accordance with the enable signal 2-15 transmitted from the decoder 2-5. The initial values stored in the flip-flops for each of channels are transmitted to the channel selector 2-10. The reason for storing data in each of channels in the FF initial value register 2-9 is that it is preferable to scramble a communication packet continuously in channels without scrambling a communication packet channel by channel.

The channel selector 2-10 selects one of the initial values in each of channels, transmitted from the FF initial value register 2-9, in accordance with the output channel signal 2-2, and transmits the thus selected initial value to the initial value selector 2-11 as a FF initial value signal 2-16.

The initial value selector 2-11 receives the channel selection signal 2-12 from the channel detector 2-6. If the received channel selection signal 2-12 indicates that the same channels were continuously detected, the initial value selector 2-11 selects the FF value 2-38 transmitted from the data selector 2-36, whereas if the received channel selection signal 2-12 indicates that the same channels were not continuously detected, the initial value selector 2-11 selects the FF initial value signal 2-16 transmitted from the channel selector 2-10. The initial value selector 2-11 outputs the thus selected signal as a FF initial value signal 2-17.

The first scrambler 2-18 is a circuit for scrambling all eight bytes in 8-byte parallel data, and transmits both principal signal data after scrambling data and a FF value 2-27 to be used when next data is scrambled.

The second scrambler 2-19 is a circuit for scrambling first seven bytes in 8-byte parallel data, and transmits both principal signal data after scrambling data and a FF value 2-28 to be used when next data is scrambled.

The third scrambler 2-20 is a circuit for scrambling first six bytes in 8 byte parallel data, and transmits both principal signal data after scrambling data and a FF value 2-29 to be used when next data is scrambled.

The fourth scrambler 2-21 is a circuit for scrambling first five bytes in 8-byte parallel data, and transmits both principal signal data after scrambling data and a FF value 2-30 to be used when next data is scrambled.

The fifth scrambler 2-22 is a circuit for scrambling first four bytes in 8 byte parallel data, and transmits both principal signal data after scrambling data and a FF value 2-31 to be used when next data is scrambled.

The seventh scrambler 2-24 is a circuit for scrambling first three bytes in 8-byte parallel data, and transmits both principal signal data after scrambling data and a FF value 2-33 to be used when next data is scrambled.

The eighth scrambler 2-25 is a circuit for scrambling first two bytes in 8-byte parallel data, and transmits both principal signal data after scrambling data and a FF value 2-34 to be used when next data is scrambled.

The ninth scrambler 2-26 is a circuit for scrambling only first byte in 8-byte parallel data, and transmits both principal signal data after scrambling data and a FF value 2-35 to be used when next data is scrambled.

The sixth scrambler 2-23 is a circuit for scrambling lowermost four bytes, that is, fifth to eighth bytes in 8-byte parallel data, and transmits both principal signal data after scrambling data and a FF value 2-32 to be used when next data is scrambled.

The data selector 2-36 selects data which is to be scrambled and has been actually scrambled, among the principal signal data and the FF values 2-27 to 2-35 transmitted from the first to ninth descramblers 2-18 to 2-26, and the outputs the thus selected data as a principal signal data 2-37 and a FF value 2-38 to be used for scrambling next data.

The data selector 2-36 selects data as follows.

The data selector 2-36 detects a timing of a top word, based on the signal 2-3 indicative of a top word in a communication packet, and further detects a timing of a final word, based on a signal indicative of a final word in a communication packet. As illustrated in FIG. 7, lowermost four bytes in 8-byte parallel data is to be scrambled for a top word. Hence, the data selector 2-36 selects an output transmitted from the sixth descrambler 2-23. All of 8-byte parallel data is to be scrambled for a word in the range of a top word to a final word. Hence, the data selector 2-36 selects an output transmitted from the first descrambler 2-18. Data to be scrambled is dependent on a number of padding bytes for a final word. Hence, the data selector 2-36 selects an output transmitted from an associated scrambler among the first to ninth scramblers 2-27 to 2-35 in accordance with the signal 2-13 indicative of a number of padding bytes, transmitted from the padding number detector 2-7.

The delay unit 2-39 receives the signal 2-3 indicative of a top word in a communication packet and a signal 2-4 indicative of a final word in a communication packet, and delays the signals 2-3 and 2-4 in accordance with a delay in the principal signal data.

Figure 10:
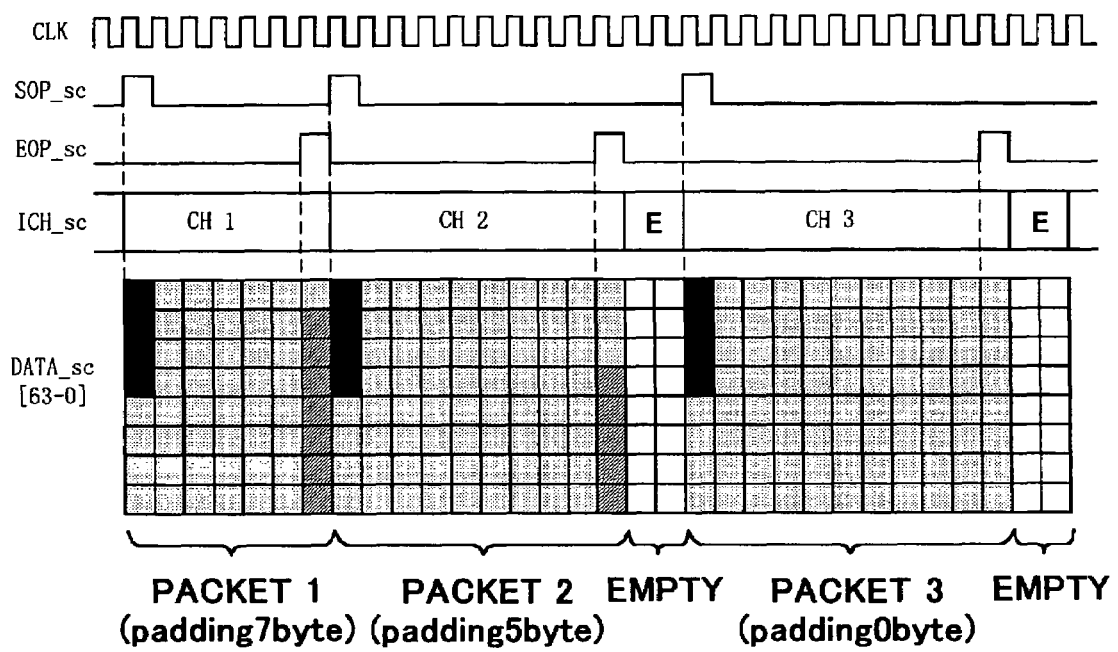
FIG. 10 illustrates an example of data structure to be input into the circuit for scrambling a communication packet, in accordance with the second embodiment.

FIG. 10 illustrates an example of data to be input into the scrambling circuit illustrated in FIG. 9.

As illustrated in FIG. 10, principal signal data indicated as DAT_sc [63-0] is developed in parallel into 8-byte data, and then, input into the scrambling circuit. A first signal (SOP_sc) indicative of a top word in a communication packet and a second signal (EOP_sc) indicative of a final word in a communication packet simultaneously run. That is, an interval between a timing at which the first signal is at a high level (SOP_sc=1) and a timing at which the second signal is at a high level (EOP_sc=1) indicates packet data. A third signal (ICH_sc) indicative of a channel number to which an input packet belongs runs simultaneously with the first and second signals.

Hereinbelow is explained an operation of the scrambling circuit in accordance with the second embodiment. The scrambling circuit in accordance with the second embodiment scrambles a communication packet having a variable length, such as GFP frame.

The scrambling circuit scrambles payload in a transmission line such that a probability by which "0" and "1" occur in the payload is equal to ½. Scrambling a packet further presents an advantage that a probability by which packets are wrongly synchronized with each other is reduced, in which case, a primitive polynomial is defined as $X^{43}+1$.

In addition, a circuit for scrambling packets continuously scrambles a packet for each of channels to which the packet belongs. That is, scrambling a packet does not finish even if one packet is scrambled.

When the scrambling circuit stores high-rate data such as data having a rate of 2.4 Gbps, such high-rate data may be stored in the form of low-rate data converted in parallel from the high-rate data, such as 52 Mbps×8 byte parallel. When a packet having a variable length is developed in parallel, the packet is treated as a packet having 8×N bytes (N is a positive integer) by adding a padding or empty byte or bytes thereto, in order that a top bit in the packet is arranged in MSB in parallel data, because such a packet can be readily processed.

When a packet having a variable length is developed in the above-mentioned manner, data to be descrambled in accordance with a packet length and padding bytes not to be descrambled coexist in a final word in the packet.

In the scrambling circuit in accordance with the second embodiment, the final word is scrambled by calculating a padding number in a final word, based on data indicative of a packet length which data is included in a communication packet. Thus, it is possible to scramble a packet comprised of various byte length, and hence having a variable length.

An operation of the scrambling circuit in accordance with the second embodiment is explained in detail hereinbelow.

An input packet 2-1 is scrambled by one of the first to ninth scramblers 2-18 to 2-26, based on the FF initial value signal 2-17 which determines a scrambler for scrambling the input packet 2-1, among the fist to ninth descramblers 2-18 to 2-26.

The first to ninth scramblers 2-18 to 2-26 scramble bytes different from one another with respect to their number and position. Hence, the bytes are scrambled by a scrambler designed to scramble the bytes, as follows.

Lowermost four bytes in 8-byte parallel data is to be scrambled for a top word. Accordingly, the data selector 2-36 selects the principal signal data and the FF value 2-32 transmitted from the sixth scrambler 2-23.

All of 8-byte parallel data is to be scrambled for a word in the range of a top word to a final word. Hence, the data selector 2-36 selects the principal signal data and the FF value 2-27 transmitted from the first scrambler 2-18.

Data to be scrambled is dependent on a number of padding bytes for a final word.

If a number of padding bytes is seven wherein data to be scrambled has one byte, the data selector 2-36 selects the principal signal data and the FF value 2-35 transmitted from the ninth scrambler 2-26.

If a number of padding bytes is six wherein data to be scrambled has two bytes, the data selector 2-36 selects the principal signal data and the FF value 2-34 transmitted from the eighth scrambler 2-25.

If a number of padding bytes is five-wherein data to be scrambled has three bytes, the data selector 2-36 selects the principal signal data and the FF value 2-33 transmitted from the seventh scrambler 2-24.

If a number of padding bytes is four wherein data to be scrambled has four bytes, the data selector 2-36 selects the principal signal data and the FF value 2-31 transmitted from the fifth scrambler 2-22.

If a number of padding bytes is three wherein data to be scrambled has five bytes, the data selector 2-36 selects the principal signal data and the FF value 2-30 transmitted from the fourth scrambler 2-21.

If a number of padding bytes is two wherein data to be scrambled has six bytes, the data selector 2-36 selects the principal signal data and the FF value 2-29 transmitted from the third scrambler 2-20.

If a number of padding bytes is one wherein data to be scrambled has seven bytes, the data selector 2-36 selects the principal signal data and the FF value 2-28 transmitted from the second scrambler 2-19.

If a number of padding bytes is zero wherein data to be scrambled has eighth bytes, the data selector 2-36 selects the principal signal data and the FF value 2-27 transmitted from the first scrambler 2-18.

The padding number detector 2-7 detects PLI in the core header (see FIG. 7), which PLI is indicative of a number of bytes in the payload area, at a timing of a top word, and counts a number of padding bytes added to a final word in a communication packet. The padding number detector 2-7 transmits the thus counted number of padding bytes to the data selector 2-36.

Since a communication packet is processed in 8-byte parallel in the second embodiment, a number of padding bytes can be in the range of 0 to 7. Hence, if such GFP frame as illustrated in FIG. 7 is to be scrambled, it would be possible to count a number of padding bytes in lowermost three bits and bits greater than the lowermost three bits in PLI indicative of a packet length or a number of bytes in the payload area.

The FF value 2-38 selected by the data selector 2-36 is stored in a storage region of a register having an associated channel, among the first to forty-eighth registers in the FF initial value register 2-9, and is used as a FF initial value when data is scrambled next in the same channel.

Only the FF value stored in a register having a channel indicated by the input channel signal 2-2 in the communication packet, among the first to forty-eighth registers in the FF initial value register 2-9 is updated to the FF value 2-38 transmitted from the data selector 2-36, if the enable signal transmitted from the decoder 2-5 is valid.

The effective area detector 2-8 receives the input channel signal 2-2, tOr 10 and transmits the enable signal 2-15 to the decoder 2-5. If channels indicated by the input channel signal 2-2 are judged valid by the effective area detector 2-8, the enable signal 2-5 transmitted from the effective area detector 2-8 indicates that the channels are enabled, whereas if channels indicated by the input channel signal 2-2 are judged invalid by the effective area detector 2-8, the enable signal 2-5 transmitted indicates that the channels are disenabled. For instance, if forty-eight channels (5-bit signal) in the range of zero-th to forty-seventh channels are in use, the effective area detector 2-8 judges channel numbers 48 to 63 invalid.

The channel selector 2-10 selects one of the initial value outputs transmitted from the FF initial value register 2-9 in each of channels, in accordance with the input channel signal 2-2, and transmits the thus selected output to the initial value selector 2-11 as a FF initial value signal 2-16 indicative of a FF initial value to be used for scrambling data in a target channel.

If data is to be scrambled in words continuously in the same channel, a FF initial value might not be updated in time for the step of scrambling a next word. Hence, if data is to be scrambled continuously in the same channel, the FF value 2-38 transmitted from the data selector 2-36 is selected by the initial value selector 2-11, and is used as a FF initial value when the first to ninth scramblers 2-18 to 2-26 descramble data.

The channel detector 2-6 judges whether data in the same channel continues or not by observing the input channel signal 2-2. The channel detector 2-6 transmits the judgment result to the initial value selector 2-11 as the channel detection signal 2-12.

If data to be scrambled in the same channel does not continue, the FF initial value signal 2-16 transmitted from the channel selector 2-6 is selected by the initial value selector 2-11, and is used as a FF initial value when the first to ninth scramblers 2-18 to 2-26 descramble data.

Figure 11:
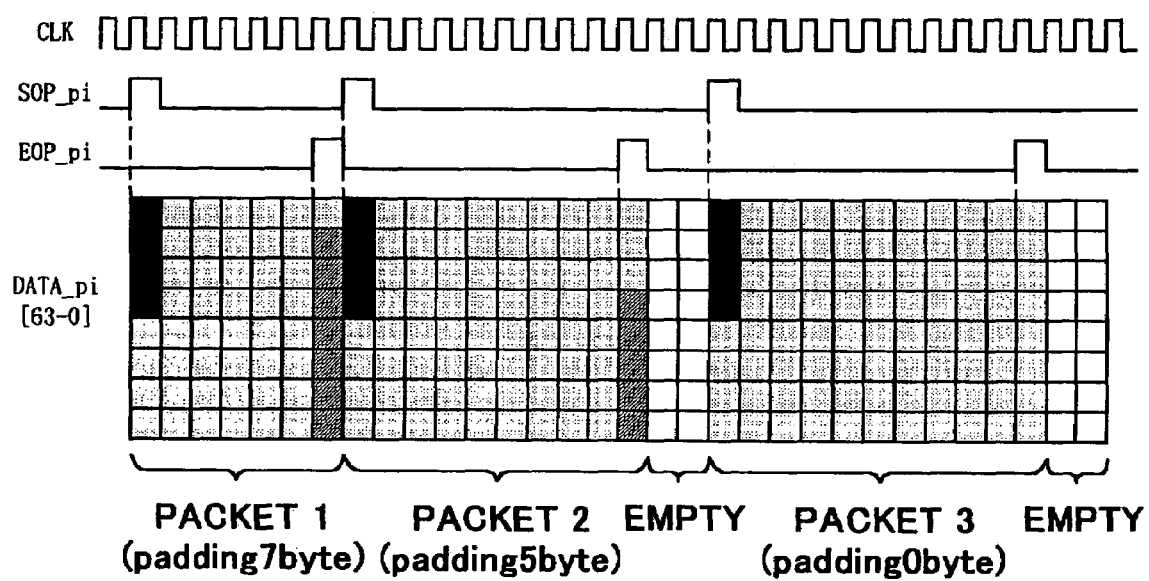
FIG. 11 illustrates an example of data structure to be output from the circuit for scrambling a communication packet, in accordance with the second embodiment.

FIG. 11 illustrates an example of data to be output from the scrambling circuit illustrated in FIG. 9.

As illustrated in FIG. 11, principal signal data indicated as DATA_pi [63-0] is developed in parallel into 8-byte data, and then, output from the scrambling circuit. A first signal (SOP_pi) indicative of a top word in a communication packet and a second signal (EOP_pi) indicative of a final word in a communication packet simultaneously run. That is, an interval between a timing at which the first signal is at a high level (SOP_pi=1) and a timing at which the second signal is at a high level (EOP_pi=1) indicates packet data.

Hereinbelow is explained characterizing parts of the scrambling circuit in accordance with the second embodiment, in comparison with a conventional scrambling circuit.

Figure 12:
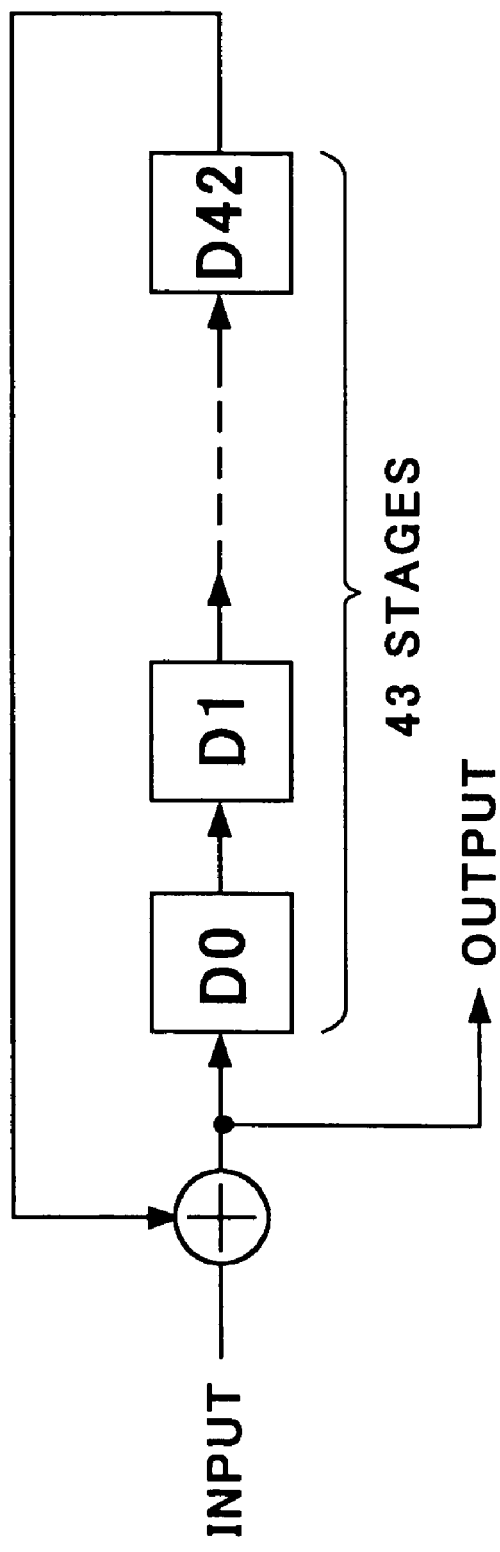
FIG. 12 is a block diagram of a conventional circuit for scrambling a communication packet.

FIG. 12 is a block diagram of a conventional circuit for scrambling a communication packet. Herein, it is assumed that the scrambling circuit illustrated in FIG. 12 scrambles a packet having a variable length, such as GFP frame illustrated in FIG. 7, in which case, a primitive polynomial is defined as $X^{43}+1$, similarly to the first embodiment.

The illustrated conventional scrambling circuit is comprised of forty three flip-flops (FF) D0 to D42 and a single exclusive-OR. The exclusive-OR receives an input signal received in the scrambling circuit, and the input signal having passed through the forty three flip-flops D0 to D42, and transmits an output signal as scrambled data.

Each of the first to forty-eighth registers in the FF initial value register 2-9 in the second embodiment is comprised of forty three flip-flops corresponding to the forty three flip-flops of the conventional scrambling circuit illustrated in FIG. 12.

Figure 13:
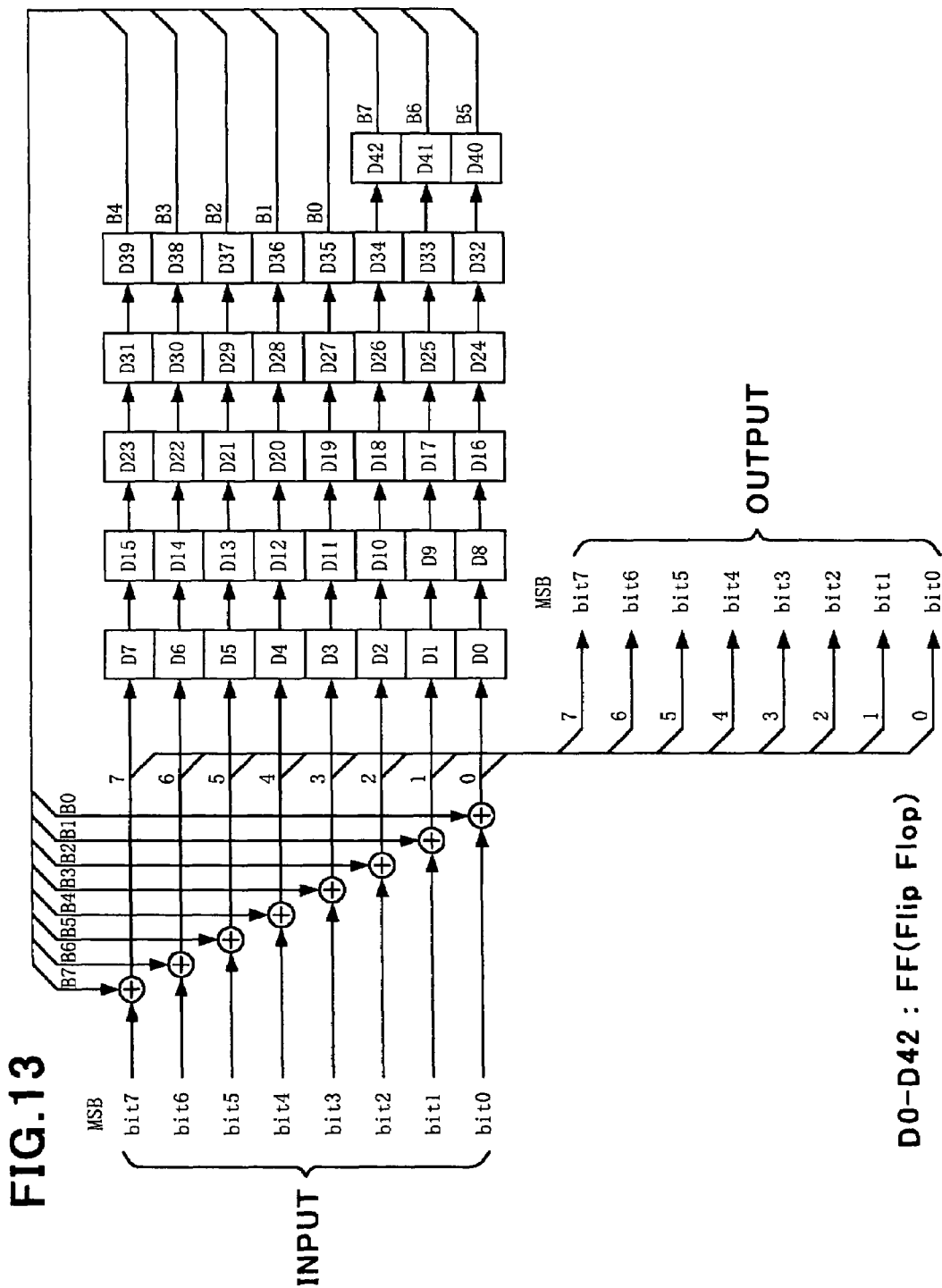
FIG. 13 illustrates how a conventional circuit for scrambling a communication packet deals with 8-bit data received in parallel.

FIG. 13 is a block diagram of a circuit for scrambling 8-bit (1-byte) data received in parallel, through the use of the conventional circuit illustrated in FIG. 12. The circuit illustrated in FIG. 13 is identical with the circuit illustrated in FIG. 12 with respect to a basic principle. The circuit is comprised of forty three flip-flops and eight exclusive-ORs.

Figure 14:
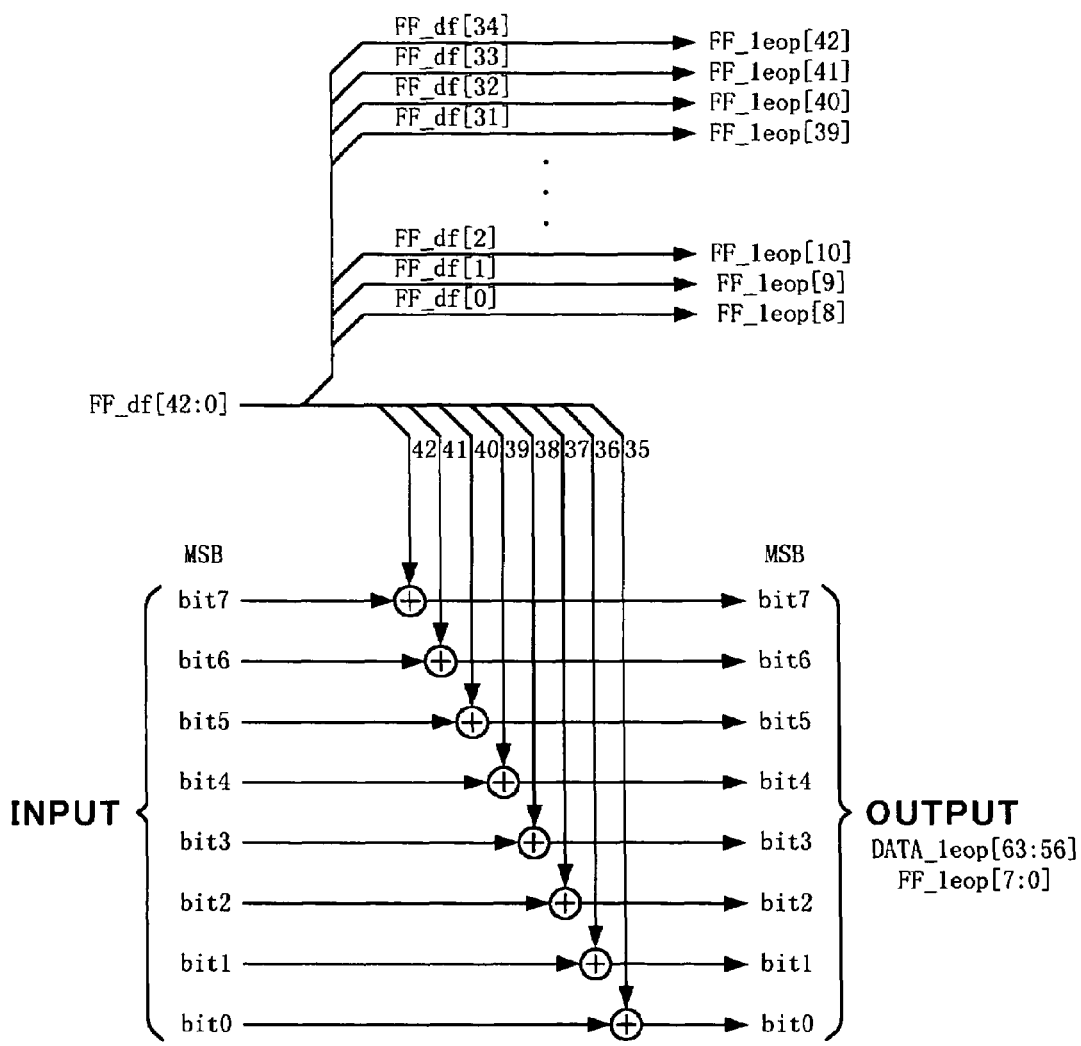
FIG. 14 is a block diagram of an internal structure of a scrambler receiving 1-byte data in parallel which scrambler partially constitutes the circuit in accordance with the second embodiment.

FIG. 14 illustrates a structure of the ninth scrambler 2-26 in the second embodiment. The ninth scrambler 2-26 is identical to the circuit illustrated in FIG. 13 with respect only to the flip-flops. A flip-flop in the 1-byte parallel scrambling circuit corresponds to a flip-flop having the associated channel in the FF initial value register 2-9.

The first to eighth scramblers 2-18 to 2-25 is identical in structure to the ninth scrambler 2-26 illustrated in FIG. 14, though a number of bytes into which data is developed in parallel is different from one another.

As having been explained above, in the scrambling circuit in accordance with the second embodiment, the padding number detector 2-7 calculates a padding number in a final word, based on data indicative of a packet length which data is added to a communication packet. Then, bytes to be scrambled in the final word is counted. Thus, only the bytes to be scrambled are actually scrambled in the final word in a communication packet having been developed in parallel. As a result, the scrambling circuit in accordance with the second embodiment makes it possible to scramble a communication packet having a variable length.

Third Embodiment

Figure 15:
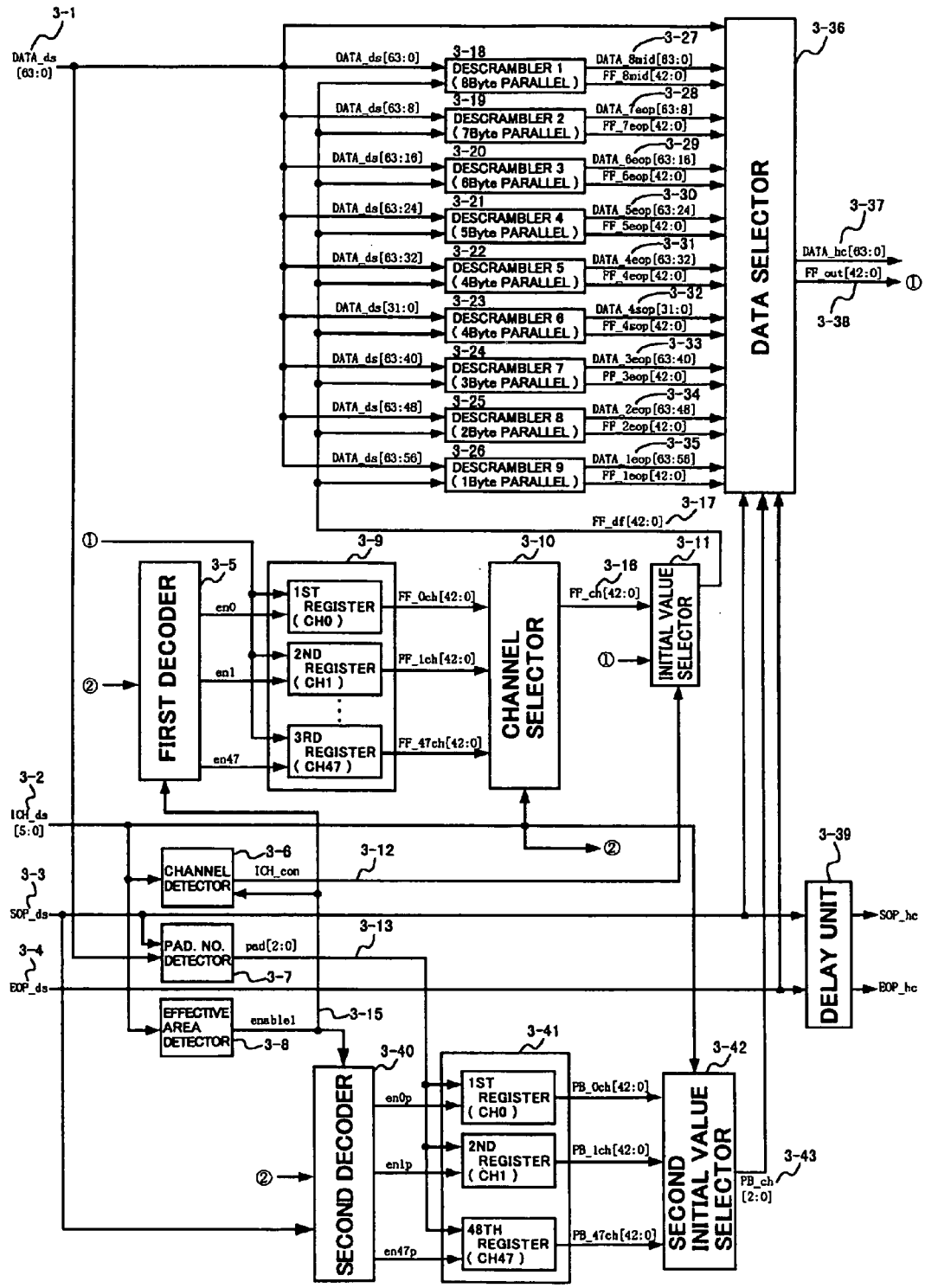
FIG. 15 is a block diagram of the circuit for descrambling a communication packet, in accordance with the third embodiment of the present invention.

FIG. 15 is a block diagram of the circuit in accordance with the third embodiment. The circuit is constructed as a circuit for descrambling a communication packet having a variable length. The circuit in accordance with the third embodiment is designed to descramble a generic flaming procedure (GFP) frame as a communication packet having a variable length, similarly to the first embodiment.

In the descrambling circuit in accordance with the third embodiment, the signal 1-13 indicative of a number of padding bytes is administered in each of channels in the padding number detector 1-7. For this purpose, the descrambling circuit in accordance with the third embodiment is designed to additionally include a second decoder 3-40, a padding byte storing register 3-41, and a second initial value selector 3-42, in comparison with the descrambling circuit in accordance with the first embodiment, illustrated in FIG. 1.

Parts or elements that correspond to those of the first embodiment illustrated in FIG. 1 have been provided with the same reference numerals with a numeral "1–" being replaced with "3–", and operate in the same manner as corresponding parts or elements in the first embodiment, unless explicitly explained hereinbelow.

Figure 16:
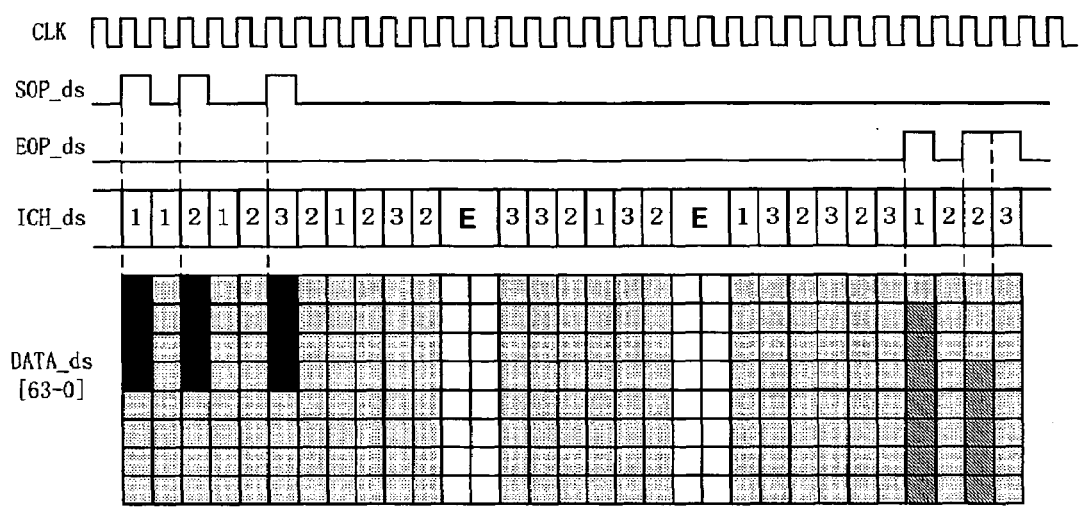
FIG. 16 illustrates an example of data structure to be input into the circuit for descrambling a communication packet, in accordance with the third embodiment.
Figure 17:
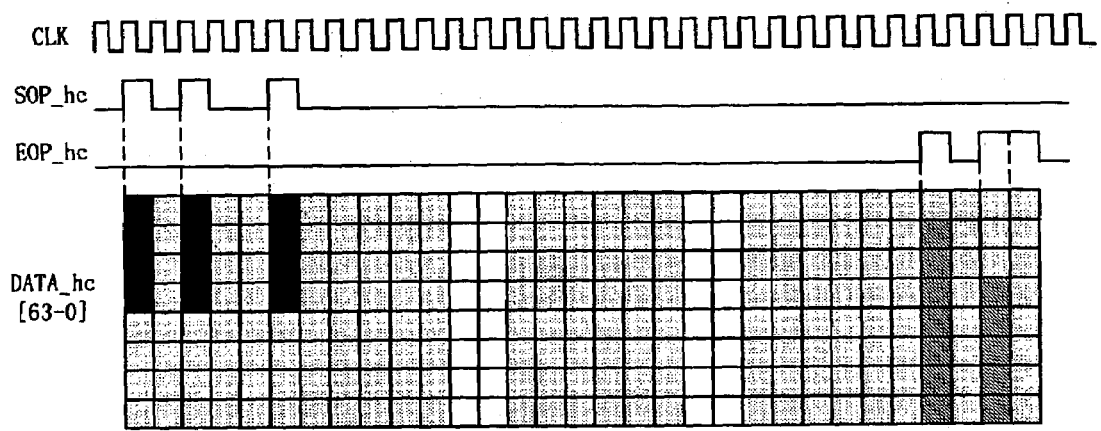
FIG. 17 illustrates an example of data structure to be output from the circuit for descrambling a communication packet, in accordance with the third embodiment.

FIG. 16 illustrates an example of data to be input into the descrambling circuit in accordance with the third embodiment, and FIG. 17 illustrates an example of data to be output from the descrambling circuit when the descrambling circuit receives the data illustrated in FIG. 16.

The second decoder 3-40 receives an enable signal 3-15 from an effective area detector 3-8, decodes an input channel signal 3-2 at a timing at which a signal 3-3 indicative of a top word indicates a top, that is, becomes 1 (one), and transmits the thus decoded input channel signal to the padding byte storing register 3-41.

The padding byte storing register 3-41 is comprised of first to forty-eighth registers, and stores a number of padding bytes in a final word in a communication packet which is being descrambled now in each of channels. Only a padding number stored in a register having a channel at which an output transmitted from the second decoder 3-40 is enabled is updated to a padding number indicated in the signal 3-13 transmitted from the padding number detector 3-7.

The second initial value selector 3-42 stores numbers of padding bytes for each of input channels. The second initial value selector 3-42 selects data indicative of a number of padding bytes in the associated channel in accordance with the input channel signal 3-2, and transmits the thus selected data to a data selector 3-36 as a signal 3-43 indicative of a number of padding bytes.

In accordance with the third embodiment, it would be possible to store numbers of padding bytes for each of channels. Whereas input data has to be multiplexed into packets in the above-mentioned first embodiment, the descrambling circuit in accordance with the third embodiment can descramble a packet multiplexed into words for each of channels, such as one illustrated in FIG. 16.

Fourth Embodiment

Figure 18:
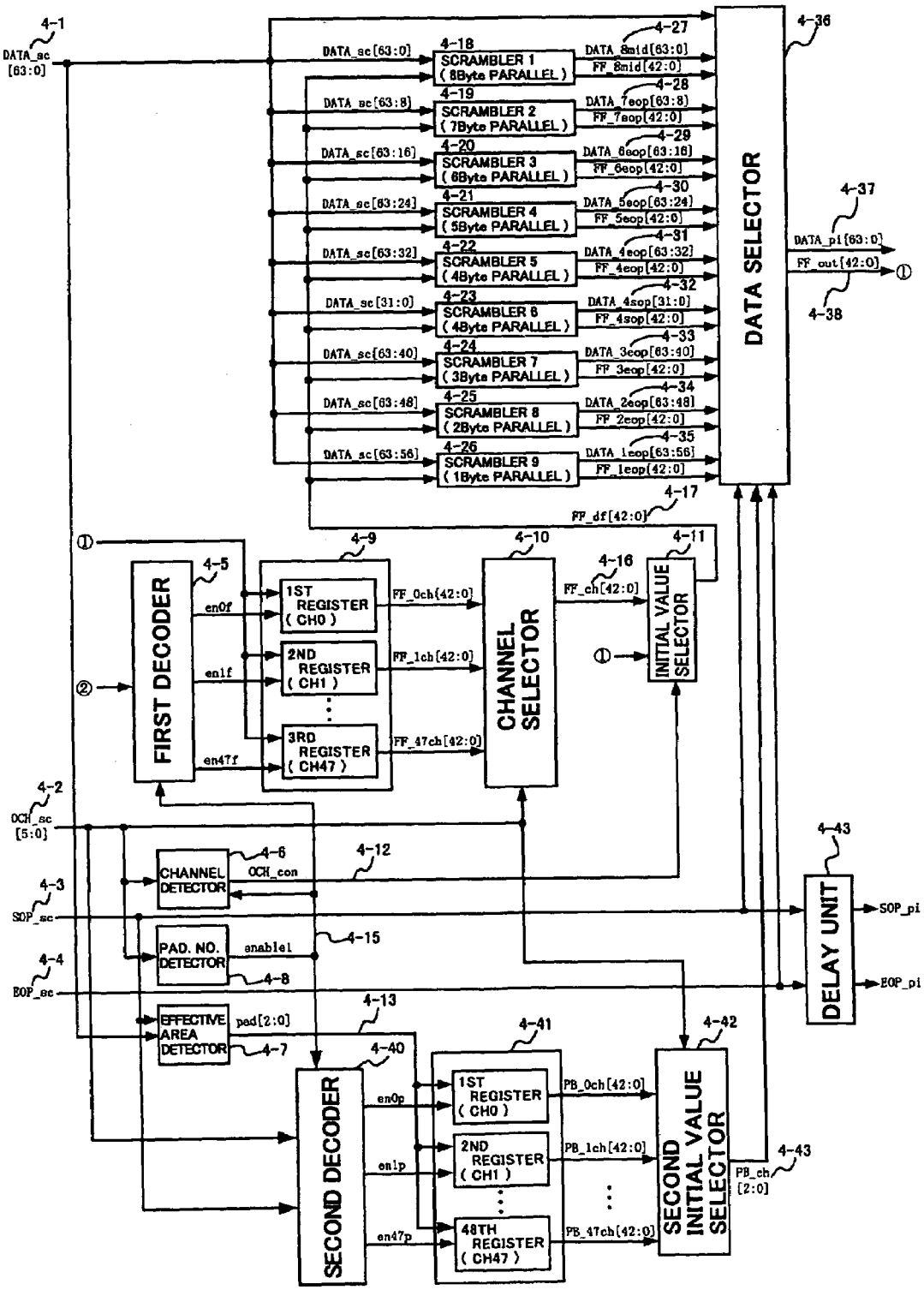
FIG. 18 is a block diagram of the circuit for scrambling a communication packet, in accordance with the fourth embodiment of the present invention.

FIG. 18 is a block diagram of the circuit in accordance with the fourth embodiment. The circuit is constructed as a circuit for scrambling a communication packet having a variable length. The circuit in accordance with the fourth embodiment is designed to scramble GFP frame as a communication packet having a variable length, similarly to the second embodiment.

In the scrambling circuit in accordance with the fourth embodiment, the signal 2-13 indicative of a number of padding bytes is administered in each of channels in the padding number detector 2-7. For this purpose, the scrambling circuit in accordance with the fourth embodiment is designed to additionally include a second decoder 4-40, a padding byte storing register 4-41, and a second initial value selector 4-42, in comparison with the scrambling circuit in accordance with the second embodiment, illustrated in FIG. 9.

Parts or elements that correspond to those of the second embodiment illustrated in FIG. 9 have been provided with the same reference numerals with a numeral "2-" being replaced with "4-", and operate in the same manner as corresponding parts or elements in the second embodiment, unless explicitly explained hereinbelow.

Figure 19:
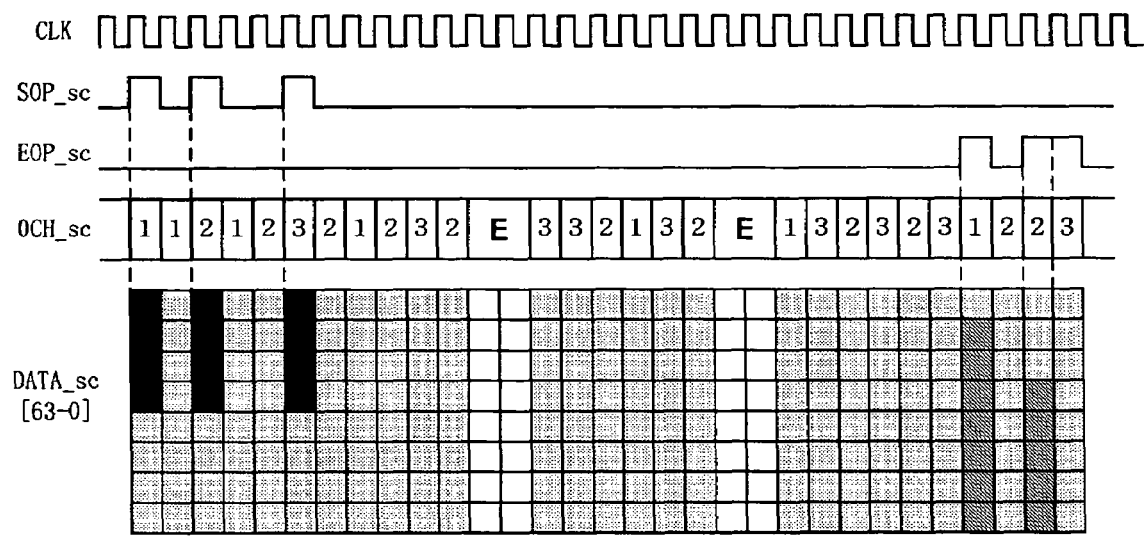
FIG. 19 illustrates an example of data structure to be input into the circuit for scrambling a communication packet, in accordance with the fourth embodiment.
Figure 20:
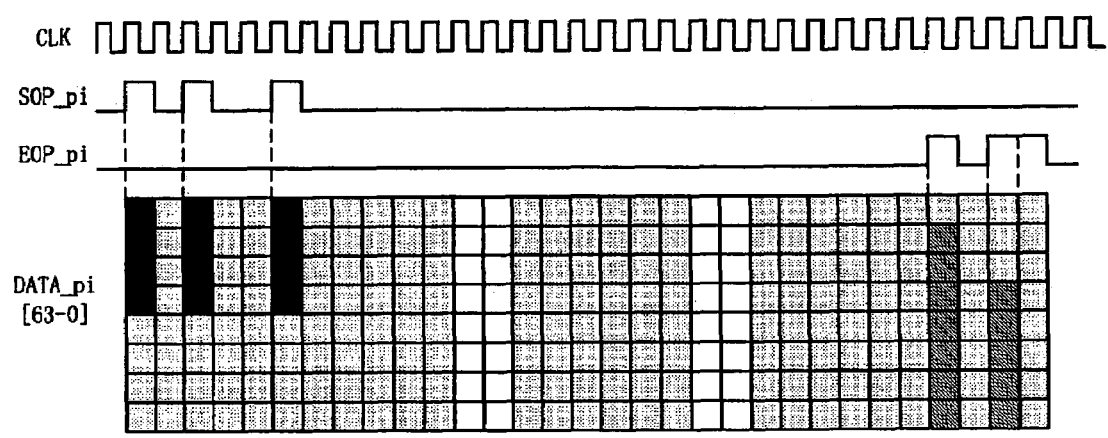
FIG. 20 illustrates an example of data structure to be output from the circuit for scrambling a communication packet, in accordance with the fourth embodiment.

FIG. 19 illustrates an example of data to be input into the scrambling circuit in accordance with the fourth embodiment, and FIG. 20 illustrates an example of data to be output from the scrambling circuit when the scrambling circuit receives the data illustrated in FIG. 19.

The second decoder 4-40 receives an enable signal 4-15 from an effective area detector 4-8, decodes an input channel signal 4-2 at a timing at which a signal 4-3 indicative of a top word indicates a top, that is, becomes 1 (one), and transmits the thus decoded input channel signal to the padding byte storing register 4-41.

The padding byte storing register 4-41 is comprised of first to forty-eighth registers, and stores a number of padding bytes in a final word in a communication packet which is being scrambled now in each of channels. Only a padding number stored in a register having a channel at which an output transmitted from the second decoder 4-40 is enabled is updated to a padding number indicated in the signal 4-13 transmitted from the padding number detector 4-7.

The second initial value selector 4-42 stores numbers of padding bytes for each of input channels. The second initial value selector 4-42 selects data indicative of a number of padding bytes in the associated channel in accordance with the input channel signal 4-2, and transmits the thus selected data to a data selector 4-36 as a signal 4-43 indicative of a number of padding bytes.

In accordance with the fourth embodiment, it would be possible to store numbers of padding bytes for each of channels. Whereas input data has to be multiplexed into packets in the above-mentioned second embodiment, the scrambling circuit in accordance with the fourth embodiment can scramble a packet multiplexed into words for each of channels, such as one illustrated in FIG. 19.

Fifth Embodiment

A communication device may include the descrambling circuit in accordance with the first or third embodiment and/or the scrambling circuit in accordance with the second or fourth embodiment for descrambling or scrambling a communication packet having a variable length. If a communication device is designed to include both the descrambling circuit in accordance with the first or third embodiment and the scrambling circuit in accordance with the second or fourth embodiment, the communication device may be designed to have single parts which are common in the descrambling and scrambling circuits. For instance, a communication device including the descrambling circuit in accordance with the first embodiment and the scrambling circuit in accordance with the second embodiment may be designed to singly include the decoder 1-5 or 2-5, the channel detector 1-6 or 2-6, the padding byte detector 1-7 or 2-7, the effective area detector 1-8 or 2-8, the FF initial value register 1-9 or 2-9, the channel selector 1-10 or 2-10, the initial value selector 1-11 or 2-11, the data selector 1-36 or 2-36, and the delay unit 1-39 or 2-39.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2001-149826 filed on May 18, 2001 including specification, claims, drawings and summary is incorporated herein by reference in its entirety.

What is claimed is:

1. A circuit for descrambling a packet one of transmitted from and received in a communication device, said circuit comprising:
(a) a plurality of descramblers which receives words obtained by developing a packet in parallel, and descrambles data in said words to be descrambled, each of said descramblers being associated with a combination of addresses of said data in said words;
(b) a padding number detector which counts a padding number of a final word among said words, based on data indicative of a packet length, which data is included in said packet; and
(c) a data selector which selects one of outputs transmitted from said descramblers in association with said combination to thereby receive data obtained by descrambling said words from a thus selected descrambler output.

2. The circuit as set forth in claim 1, wherein received data is developed in parallel into 8-byte packets.

3. The circuit as set forth in claim 2, wherein said plurality of descramblers is comprised of first to ninth descramblers, where said first to eighth descramblers descramble data occupying first to N-th bytes among said 8 bytes, respectively, wherein N is an integer of 1 to 8, and said ninth descrambler descrambles data occupying a lower 4 bytes among said 8 bytes, said data selector selects (a) an output transmitted from said ninth descrambler, for a top word, (b) an output transmitted from one of said first to eighth descramblers which descrambles all of said 8-byte parallel data, for a word in a range of a top word to a final word, or (c) an output transmitted from one of said first to eighth descramblers, for a final word, in association with a number of bytes to be descrambled in said final word, based on a padding number of said final word detected by said padding number detector.

4. The circuit as set forth in claim 1, further comprising a register which administrates a number of padding bytes for each descrambler.

5. The circuit as set forth in claim 1, wherein a packet having a variable length is developed in parallel such that data to be descrambled in accordance with a packet length and padding bytes not to be descrambled are contained in a final word in the packet.

6. A circuit for scrambling a packet one of transmitted from and received in a communication device, said circuit comprising:

(a) a plurality of scramblers which receives words obtained by developing a packet in parallel, and scrambles data in said words to be scrambled, each of said scramblers being associated with a combination of addresses of said data in said words;

(b) a padding number detector which counts a padding number of a final word among said words, based on data indicative of a packet length, which data is included in said packet; and (c) a data selector which selects one of outputs transmitted from said scramblers in association with said combination to thereby receive data obtained by scrambling said words from a thus selected scrambler output.

7. The circuit as set forth in claim 6, wherein received data is developed in parallel into 8-byte packets.

8. The circuit as set forth in claim 7, wherein said plurality of scramblers is comprised of first to ninth scramblers, where said first to eighth scramblers scramble data occupying first to N-th bytes among said 8 bytes, respectively, wherein N is an integer of 1 to 8, and said ninth scrambler scrambles data occupying a lower 4 bytes among said 8 bytes, said data selector selects (a) an output transmitted from said ninth scrambler, for a top word, (b) an output transmitted from one of said first to eighth scramblers which scrambles all of said 8-byte parallel data, for a word in a range of a top word to a final word, or (c) an output transmitted from one of said first to eighth scramblers, for a final word, in association with a number of bytes to be scrambled in said final word, based on a padding number of said final word detected by said padding number detector.

9. The circuit as set forth in claim 6, further comprising a register which administrates a number of padding bytes for each scrambler.

10. A method of descrambling a packet one of transmitted from and received in a communication device, said method comprising:

developing a packet in parallel to obtain words;

for a plurality of times in association with a combination of addresses of said data in said words, descrambling data in said words to be descrambled;

counting a padding number of a final word among said words, based on data indicative of a packet length, which data is included in said packet; and selecting one of results from said descrambling in association with said combination.

11. The method as set forth in claim 10, wherein received data is developed in parallel into 8-byte packets.

12. The method as set forth in claim 11, wherein said descrambling includes:

(1) descrambling data occupying first to N-th bytes among said 8 bytes, respectively, wherein N is an integer of 1 to 8; and (2) descrambling data occupying a lower 4 bytes among said 8 bytes, and said selecting includes selecting (a) a result of (2), for a top word, (b) a result of (1) for a word in a range of a top word to a final word, or (c) a result of (1) for a final word, in association with a number of bytes to be descrambled in said final word, based on a padding number of said final word detected in said counting.

13. The method as set forth in claim 10, further comprising administrating a number of padding bytes for each descrambling operation.

14. A method of scrambling a packet one of transmitted from and received in a communication device, said method comprising:

developing a packet in parallel to obtain words;

for a plurality of times in association with a combination of addresses of said data in said words, scrambling data in said words to be scrambled;

counting a padding number of a final word among said words, based on data indicative of a packet length, which data is included in said packet; and selecting one of results from said scrambling in association with said combination.

15. The method as set forth in claim 14, wherein received data is developed in parallel into 8-byte packets.

16. The method as set forth in claim 15, wherein said scrambling includes:

(1) scrambling data occupying first to N-th bytes among said 8 bytes, respectively, wherein N is an integer of 1 to 8; and (2) scrambling data occupying a lower 4 bytes among said 8 bytes, and said selecting includes selecting (a) a result of (2), for a top word, (b) a result of (1) for a word in a range of a top word to a final word, or (c) a result of (1) for a final word, in association with a number of bytes to be scrambled in said final word, based on a padding number of said final word detected in said counting.

17. The method as set forth in claim 14, further comprising administrating a number of padding bytes for each scrambling operation.

18. A communication device which receives a packet therein and transmits a packet therefrom, comprising:

(a) a first circuit for descrambling said received packet, said first circuit including a plurality of descramblers which receives words obtained by developing said packet in parallel, and descrambles data in said words to be descrambled, each of said descramblers being associated with a combination of addresses of said data in said words;

(b) a second circuit for scrambling said received packet, said second circuit including a plurality of scramblers which receives words obtained by developing said packet in parallel, and scrambles data in said words to be scrambled, each of said scramblers being associated with a combination of addresses of said data in said words;

(c) a padding number detector which counts a padding number of a final word among said words, based on data indicative of a packet length, which data is included in said packet; and (d) a data selector which selects one of outputs transmitted from said descramblers in association with said combination to thereby receive data obtained by descrambling said words from a thus selected descrambler, and which further selects one of outputs transmitted from said scramblers in association with said combination to thereby receive data obtained by scrambling said words from the thus selected scrambler output.

19. The communication device as set forth in claim 18, wherein received data is developed in parallel into 8-byte packets.

20. The communication device as set forth in claim 19, wherein said plurality of descramblers is comprised of first to ninth descramblers, where said first to eighth descramblers descramble data occupying first to N-th bytes among said 8 bytes, respectively, wherein N is an integer of 1 to 8, and said ninth descrambler descrambles data occupying a lower 4 bytes among said 8 bytes, said data selector selects (a) an output transmitted from said ninth descrambler, for a top word, (b) an output transmitted from one of said first to eighth descramblers which descrambles all of said 8-byte parallel data, for a word in a range of a top word to a final word, or (c) an output transmitted from one of said first to eighth descramblers, for a final word, in association with a number of bytes to be descrambled in said final word, based on a padding number of said final word detected by said padding number detector.

21. The communication device as set forth in claim 19, wherein said plurality of scramblers is comprised of first to ninth scramblers, where said first to eighth scramblers scramble data occupying first to N-th bytes among said 8 bytes, respectively, wherein N is an integer of 1 to 8, and said ninth scrambler scrambles data occupying a lower 4 bytes among said 8 bytes, said data selector selects (a) an output transmitted from said ninth scrambler, for a top word, (b) an output transmitted from one of said first to eighth scramblers which scrambles all of said 8-byte parallel data, for a word in a range of a top word to a final word, or (c) an output transmitted from one of said first to eighth scramblers, for a final word, in association with a number of bytes to be scrambled in said final word, based on a padding number of said final word detected by said padding number detector.

22. The communication device as set forth in claim 18, further comprising a register which administrates a number of padding bytes for each scrambler and descrambler.

* * * * *